US011853162B2

(12) United States Patent
Sakai

(10) Patent No.: US 11,853,162 B2
(45) Date of Patent: Dec. 26, 2023

(54) CONTROLLER AND STORAGE DEVICE

(71) Applicant: SONY SEMICONDUCTOR SOLUTIONS CORPORATION, Kanagawa (JP)

(72) Inventor: Lui Sakai, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/777,915

(22) PCT Filed: Nov. 5, 2020

(86) PCT No.: PCT/JP2020/041328
§ 371 (c)(1),
(2) Date: May 18, 2022

(87) PCT Pub. No.: WO2021/106514
PCT Pub. Date: Jun. 3, 2021

(65) Prior Publication Data
US 2022/0405168 A1 Dec. 22, 2022

(30) Foreign Application Priority Data
Nov. 28, 2019 (JP) .................... 2019-215091

(51) Int. Cl.
G11C 29/00 (2006.01)
G06F 11/10 (2006.01)
(Continued)

(52) U.S. Cl.
CPC ...... *G06F 11/1068* (2013.01); *G06F 11/0772* (2013.01); *G06F 13/4068* (2013.01)

(58) Field of Classification Search
CPC ............. G06F 11/1068; G06F 11/0772; G06F 13/4068
See application file for complete search history.

(56) References Cited

U.S. PATENT DOCUMENTS

2008/0092017 A1* 4/2008 Keays ............... H03M 13/1515
714/E11.056
2011/0239082 A1* 9/2011 Yang .................... H03M 13/37
714/755
(Continued)

FOREIGN PATENT DOCUMENTS

CN 102201266 A 9/2011
EP 2372550 A1 10/2011
(Continued)

OTHER PUBLICATIONS

International Search Report and Written Opinion of PCT Application No. PCT/JP2020/041328, dated Feb. 9, 2021, 09 pages of ISRWO.

*Primary Examiner* — Samir W Rizk
(74) *Attorney, Agent, or Firm* — CHIP LAW GROUP

(57) ABSTRACT

A controller includes a processing circuit that writes each of a plurality of data fragments each including a part of data to be written in one memory chip of a plurality of memory chips each having an error correction function, and reads the data fragments corresponding to the data to be read from the memory chips, a first encoder that encodes the data to be written with an erasure correction code such that each of the data fragments includes a parity, and a first decoder that performs erasure correction by use of a part of the data fragments corresponding to the data to be read according to a completion status or success or failure of error correction on a corresponding part of the data fragments in each of the memory chips, the completion status or the success or failure of the error correction being acquired via a signal line.

20 Claims, 25 Drawing Sheets

(51) Int. Cl.
*G06F 11/07* (2006.01)
*G06F 13/40* (2006.01)

(56) References Cited

U.S. PATENT DOCUMENTS

| | | | |
|---|---|---|---|
| 2011/0239083 A1 | 9/2011 | Kanno | |
| 2013/0191705 A1 | 7/2013 | Watanabe et al. | |
| 2018/0276071 A1 | 9/2018 | Shimizu | |
| 2019/0114224 A1* | 4/2019 | Motwani | G11C 29/52 |

FOREIGN PATENT DOCUMENTS

| | | |
|---|---|---|
| JP | 2010-079485 A | 4/2010 |
| JP | 2011-203878 A | 10/2011 |
| JP | 2012-128660 A | 7/2012 |
| JP | 2014-238871 A | 12/2014 |
| JP | 2018-160166 A | 10/2018 |
| KR | 10-2011-0107273 A | 9/2011 |
| TW | 201246216 A | 11/2012 |
| WO | 2012/081733 A1 | 6/2012 |

* cited by examiner

CONTROLLER AND STORAGE DEVICE

CROSS REFERENCE TO RELATED APPLICATIONS

This application is a U.S. National Phase of International Patent Application No. PCT/JP2020/041328 filed on Nov. 5, 2020, which claims priority benefit of Japanese Patent Application No. JP 2019-215091 filed in the Japan Patent Office on Nov. 28, 2019. Each of the above-referenced applications is hereby incorporated herein by reference in its entirety.

TECHNICAL FIELD

The present disclosure relates to a controller and a storage device.

BACKGROUND ART

In recent years, a memory such as a NAND flash memory has been developed in which techniques such as a miniaturization process, a multilayer structure, and multi-level cells are adopted. In particular, the most advanced memory is expected to increase the capacity of a storage device. For applying the most advanced memory, it is required to satisfy requirements such as capacity, speed, and reliability according to the purpose of use.

CITATION LIST

Patent Document

Patent Document 1: Japanese Patent Application Laid-Open No. 2014-238871
Patent Document 2: Japanese Patent Application Laid-Open No. 2010-79485

SUMMARY OF THE INVENTION

Problems to be Solved by the Invention

However, in the most advanced memory, it is necessary to take measures against an increase in the bit error rate due to the adoption of the miniaturization process or the multi-level cells. Therefore, introduction of error correction codes such as low density parity check (LDPC) codes and soft decision repetition codes has been advanced. These codes have a high error correction capability, but have a problem of affecting performance such as traffic between memory chips and a controller, power consumption, and latency.

Therefore, the present disclosure provides a controller and a storage device that achieve both high reliability and performance.

Solutions to Problems

A controller according to one aspect of the present disclosure may include: a processing circuit configured to write each of a plurality of data fragments each including a part of data to be written in one memory chip of a plurality of memory chips each having an error correction function, and read the data fragments corresponding to the data to be read from the memory chips; a first encoder configured to encode the data to be written with an erasure correction code such that each of the data fragments includes a parity; and a first decoder configured to perform erasure correction by use of a part of the data fragments corresponding to the data to be read according to a completion status or success or failure of error correction on a corresponding part of the data fragments in each of the memory chips, the completion status or the success or failure of the error correction being acquired via a signal line.

The processing circuit may be configured to refer to the signal line and read the data fragments from the memory chips in an order in which the error correction has been completed.

The first decoder may be configured to perform the erasure correction when the processing circuit reads a part of the data fragments from a part of the memory chips among the memory chips in which the data fragments have been written.

The first decoder may be configured to perform the erasure correction by use of a part of the data fragments read by the processing circuit when at least one of the memory chips is performing the error correction.

The processing circuit may be configured to notify a host system of the completion status or the success or failure of the error correction on the corresponding part of the data fragments in each of the memory chips.

A controller according to one aspect of the present disclosure may include a processing circuit configured to write each of a plurality of data fragments each including a part of data to be written in one memory chip of a plurality of memory chips, and read the data fragments corresponding to the data to be read from the memory chips; a first encoder configured to encode the data to be written with an erasure correction code such that each of the data fragments includes a parity; a second encoder configured to encode the data fragments with an error correction code before the processing circuit writes the data fragments in the memory chips; a second decoder configured to perform error correction on the data fragments read from the memory chips by the processing circuit; and a first decoder configured to perform erasure correction by use of a part of the data fragments for which the error correction by the second decoder has been completed among the data fragments corresponding to the data to be read.

The first decoder may be configured to perform, when the second decoder is performing the error correction on at least one of the data fragments, the erasure correction by use of another part of the data fragments for which the error correction has been completed.

A storage device according to one aspect of the present disclosure may include: a plurality of memory chips each having an error correction function; and a controller configured to encode data to be written with an erasure correction code such that each of a plurality of data fragments obtained by dividing the data includes a parity, divide the data into the plurality of data fragments, write each of the data fragments in one memory chip of the plurality of memory chips, and perform erasure correction by use of a part of the data fragments among the data fragments corresponding to the data to be read according to a completion status or success or failure of error correction on a corresponding part of the data fragments in each of the memory chips, the completion status or the success or failure of the error correction being acquired via a signal line.

The controller may be configured to perform the erasure correction by use of a read part of the data fragments when at least one of the memory chips is performing the error correction.

The memory chips may include a second encoder configured to encode the data fragments written by the controller with an error correction code and then store the data fragments in memory cells, and a second decoder configured to perform error correction on the data fragments corresponding to the data to be read and notify the controller of a completion status or success or failure of the error correction via the signal line.

The controller may be electrically connected to the plurality of memory chips via individual data lines.

The controller may be electrically connected to the plurality of memory chips via a common data line.

The memory chips may include a NAND flash memory.

The controller may be configured to notify a host system of the completion status or the success or failure of the error correction on the corresponding part of the data fragments in each of the memory chips.

An interface conversion circuit configured to convert the data read by the controller into a packet capable of being transferred by a network and convert the packet received from the network into a format capable of being input to the controller may be further included.

A storage device according to one aspect of the present disclosure may include: a plurality of memory chips; and a controller configured to encode data to be written with an erasure correction code such that each of a plurality of data fragments obtained by dividing the data includes a parity, divide the data into the plurality of data fragments, encode the data fragments with an error correction code, write each of the data fragments in one memory chip of the plurality of memory chips, perform error correction on the data fragments read from the memory chips when the data is read, and perform erasure correction by use of a part of the data fragments for which the error correction has been completed among the data fragments corresponding to the data to be read.

The controller may be electrically connected to the plurality of memory chips via individual data lines.

The controller may be electrically connected to the plurality of memory chips via a common data line.

The memory chips may include a NAND flash memory.

An interface conversion circuit configured to convert the data read by the controller into a packet capable of being transferred by a network and convert the packet received from the network into a format capable of being input to the controller may be further included.

MODE FOR CARRYING OUT THE INVENTION

Hereinafter, preferred embodiments of the present disclosure will be described in detail with reference to the accompanying drawings. Note that, in the present specification and the drawings, components having substantially the same functional configuration are denoted by the same reference sign, and thus redundant description is omitted.

Figure 1:
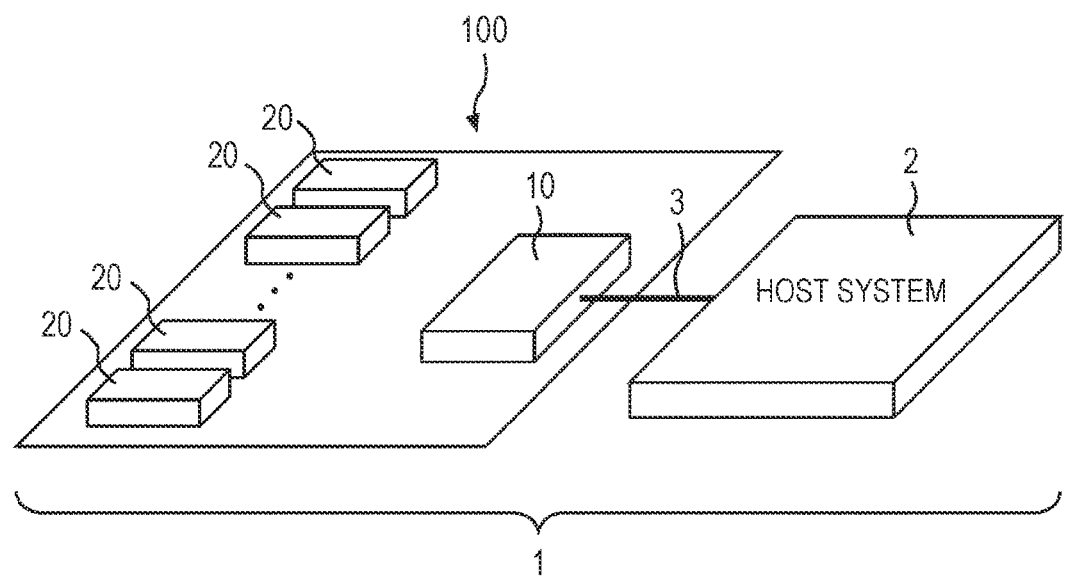
FIG. 1 is a diagram illustrating an example of a system including a storage device according to the present disclosure.

FIG. 1 illustrates an example of a system including a storage device according to the present disclosure. A system 1 in FIG. 1 includes a host system 2 and a storage device 100 connected to the host system 2. The host system 2 is, for example, an information processing device such as a computer including a central processing unit (CPU). The storage device 100 provides a storage area that can be used by the host system 2.

The storage device 100 includes a plurality of memory chips 20 and a controller 10. The controller 10 is connected to the host system 2 via a bus 3. The bus 3 is, for example, a physical interface compatible with PCI Express, M.2, U.2, Serial Attached SCSI, NVM Express, Universal Serial Bus (USB) or the like. The type of the physical interface between the controller 10 and the host system 2 is not limited. Each of the memory chips 20 includes, for example, a nonvolatile memory such as a NAND flash memory, a NOR flash memory, a phase change memory, a magnetoresistive memory, or a resistance change memory. Note that the memory chips 20 may be a combination of a plurality of types of nonvolatile memories. Furthermore, the memory chips 20 may include a volatile memory such as a DRAM or an SRAM.

The number of the memory chips 20 mounted on the storage device 100 can be determined according to the required storage capacity, write speed, and read speed, or reliability of memory cells to be used. FIG. 1 illustrates four memory chips 20. However, the number N of the memory chips 20 mounted on the storage device 100 is not limited. Note that the storage device 100 may include a component capable of storing power, such as a battery or a capacitor. These components provide the necessary power to back up data on the volatile memory to the nonvolatile memory in the event of a sudden power interruption, thereby preventing data loss.

Figure 2:
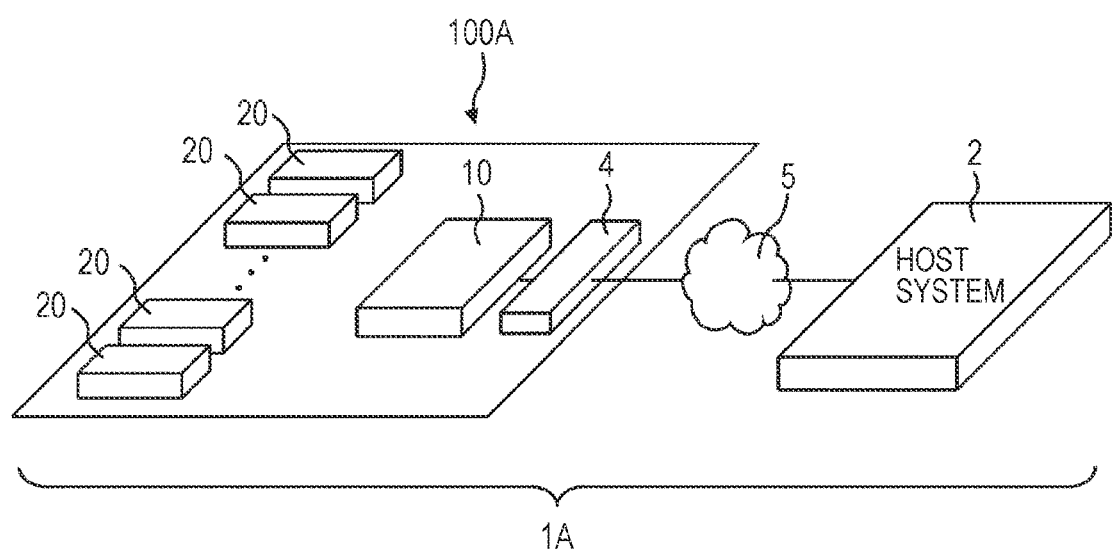
FIG. 2 is a diagram illustrating an example of a storage device connected to a host system via a network.

FIG. 2 illustrates an example of a storage device connected to the host system via a network. A system 1A in FIG. 2 includes the host system 2 and a storage device 100A. The host system 2 can communicate with the storage device 100A via a network 5. The network 5 is a communication network capable of packet communication by, for example, TCP/IP, Fibre Channel, Infiniband, or the like. As the network 5, a communication network constructed by a wired network, a wireless network, or a combination of wired and wireless networks can be used. The type of a communication protocol used in the network 5 is not limited.

The storage device 100A includes an interface conversion circuit 4 in addition to the components of the storage device 100. The interface conversion circuit 4 is connected between the controller 10 and the network 5. The interface conversion circuit 4 converts data output from the controller 10 into a format (for example, a packet) that can be transferred by the network 5. Furthermore, the interface conversion circuit 4 converts a packet transmitted from the host system 2 into data in a format that can be input to the controller 10. As the interface conversion circuit 4, for example, a circuit compatible with NVMe over Fabrics can be used.

The function of the interface conversion circuit 4 enables the host system 2 to perform read processing or write processing of the storage device via the network 5. Note that a circuit may be used in which a function corresponding to the interface conversion circuit 4 and a function corresponding to the controller 10 are integrated instead of dividing the interface conversion circuit 4 and the controller 10 into separate circuits as in the example of FIG. 2.

Figure 3:
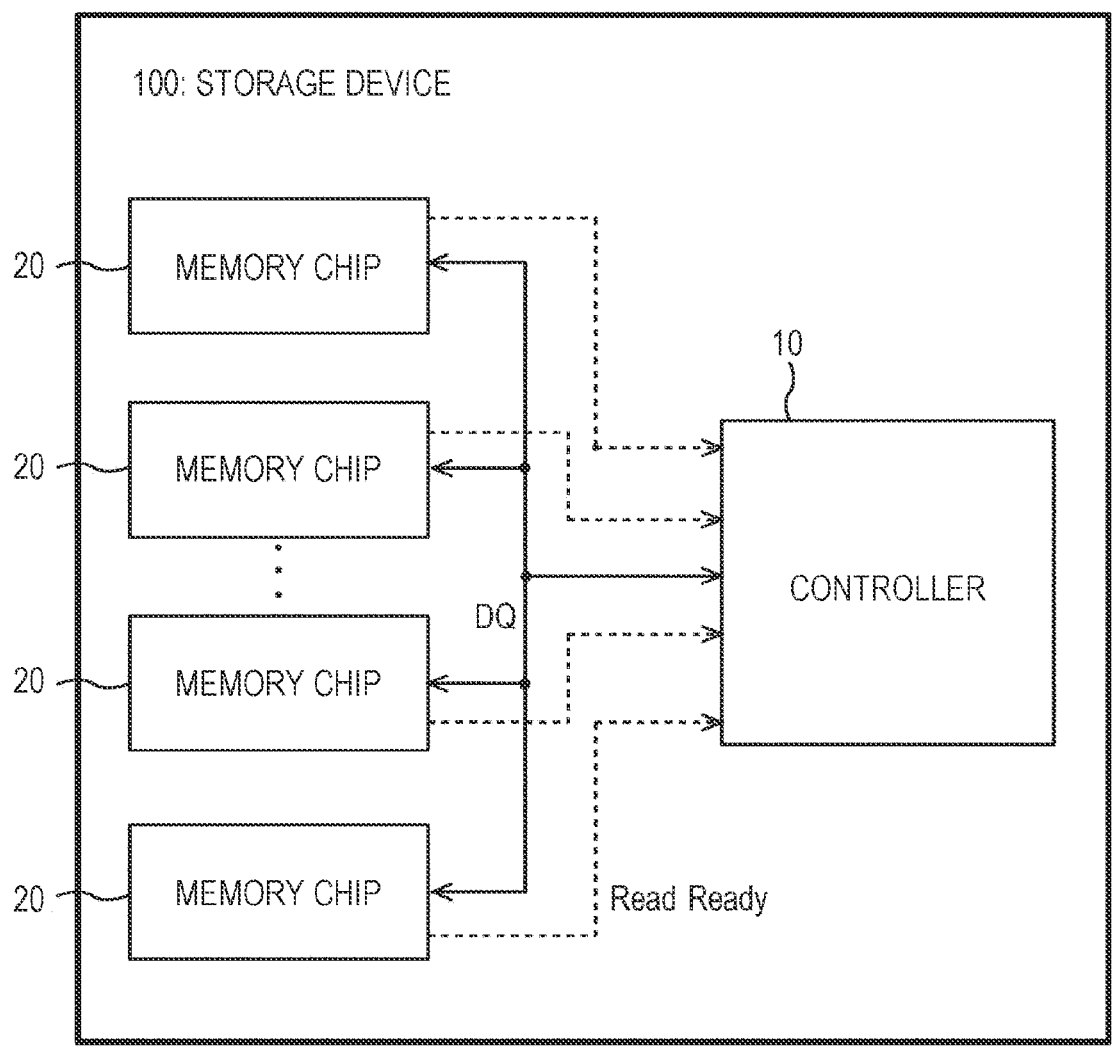
FIG. 3 is a block diagram schematically illustrating an example of the storage device according to the present disclosure.

The block diagram of FIG. 3 schematically illustrates an example of the storage device according to the present disclosure. FIG. 3 illustrates an example of wiring between the controller 10 and the plurality of memory chips 20 in the storage device 100. A signal line DQ (solid line in FIG. 3) corresponds to a data line between the memory chips 20 and the controller 10. In the configuration of FIG. 3, one signal line DQ connected to the controller 10 is branched and connected to the plurality of memory chips 20. The signal line DQ may be shared for use in data reading and data writing. Furthermore, separate signal lines may be prepared for use in data reading and data writing. Meanwhile, broken lines in FIG. 3 indicate signal lines Read Ready for supplying the controller 10 with a state signal indicating whether or not data reading in each of the memory chips 20 is enabled. In FIG. 3, the controller 10 is connected to each of the memory chips 20 via an individual one of the signal lines Read Ready.

Note that the storage device according to the present disclosure may include another signal line not illustrated in FIG. 3. Furthermore, the wiring of the data line and the signal lines Read Ready illustrated in FIG. 3 is merely an example. Therefore, the wiring of the data line and the signal lines Read Ready may be different from this wiring.

Figure 4:
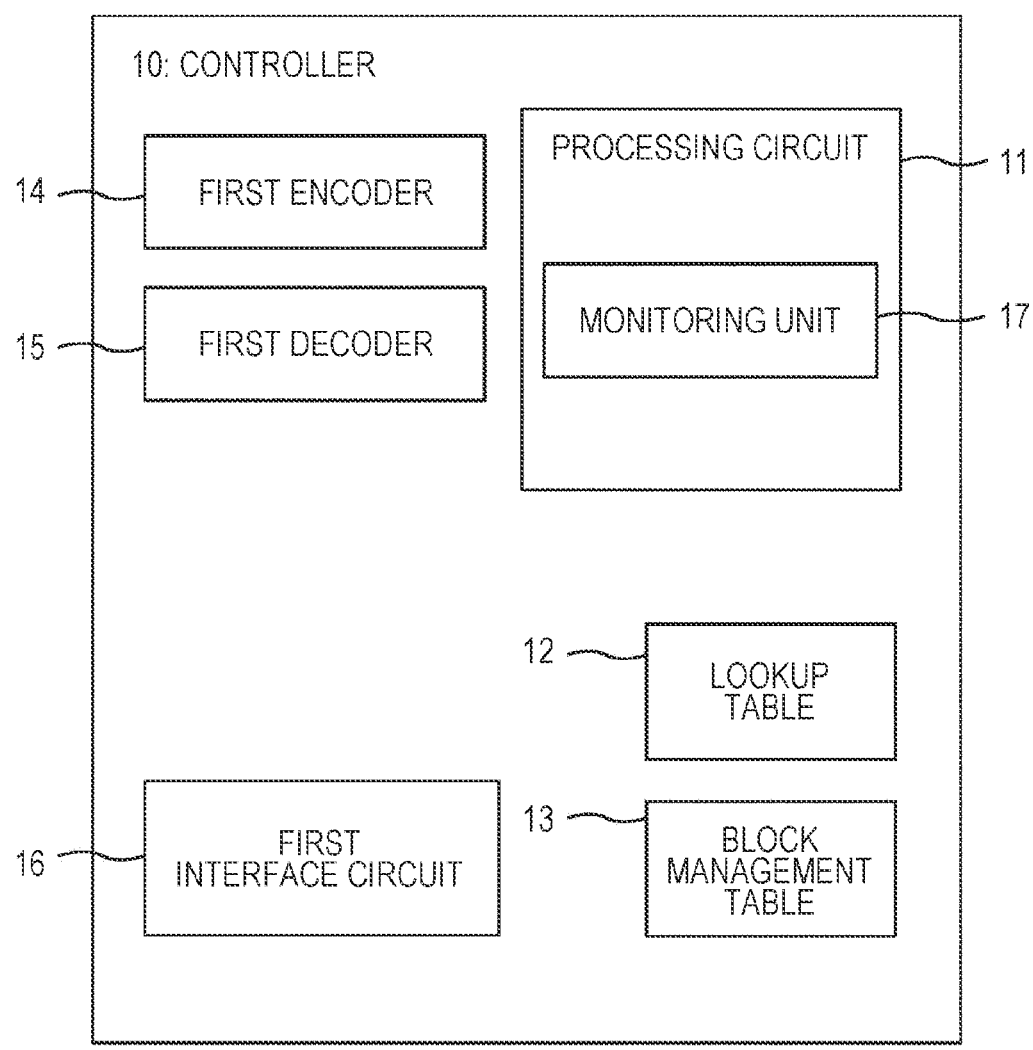
FIG. 4 is a block diagram schematically illustrating an example of a controller according to the present disclosure.

The block diagram of FIG. 4 schematically illustrates an example of the controller according to the present disclosure. The controller 10 in FIG. 4 is, for example, a hardware circuit such as a system-on-a-chip including a microprocessor. Examples of the hardware circuit include various processors, ASICs, or FPGAs. However, the type of the hardware circuit used for mounting the controller 10 is not limited. At least a part of the functions of the controller 10 may be executed by a program such as firmware operating on the microprocessor. In this case, the controller 10 may include a memory that stores the program and data necessary for executing the program. The controller 10 in FIG. 4 includes a processing circuit 11, a lookup table 12, a block management table 13, a first encoder 14, a first decoder 15, and a first interface circuit 16.

The controller 10 uses the lookup table 12 to manage a correspondence between logical addresses and physical addresses in the plurality of memory chips 20. As the logical addresses, for example, logical block addresses (LBAs) designated by the host can be used. Furthermore, as the physical addresses, for example, physical block addresses can be used. In the lookup table 12, a physical block associated with an LBA is referred to as a valid block. On the other hand, in the lookup table 12, a physical block not associated with any LBA is referred to as an invalid block. The controller 10 can update the lookup table 12 when data is written or erased.

The controller 10 may use the block management table 13 to manage the number of times of erasure for each physical block in the memory chips 20, a defective block in the memory chips 20, and information regarding valid blocks and invalid blocks. The controller 10 may perform wear leveling on physical blocks by using the lookup table 12 and the block management table 13. In the wear leveling, in a case where a request to write data is received from the host, a physical block having the smallest number of times of erasure among the invalid blocks is designated as a data write destination. As a result, the number of times of erasure in the plurality of physical blocks in the memory chips 20 can be made uniform, and deterioration of the memory cells can be delayed.

The controller 10 may include a write buffer that temporarily stores data to be written by the host system 2. Furthermore, the controller 10 may include a read buffer that temporarily stores data read from the memory chips 20. As a buffer, for example, a volatile memory such as an SRAM or a DRAM can be used. As the write buffer or the read buffer, a volatile memory arranged outside the controller 10 may be used.

In a case where a NAND flash memory is used in the memory chips 20, the controller 10 can read and write data in a unit of a page. The size of one page is, for example, 512 bytes, 1 kilobyte, 2 kilobytes, 4 kilobytes, or 8 kilobytes. However, the size of a page is not limited.

In the case of receiving a request to write data having a size larger than one page, the controller 10 can sequentially perform writing in a plurality of pages in the same physical block. However, the controller 10 cannot overwrite a written page. Instead, the controller 10 erases data on the NAND flash memory in a unit of a block having a granularity larger than a page. One block includes, for example, 32 pages to 512 pages. However, the number of pages included in a block may be different from this number.

The controller 10 executes processing called read-modify-write in order to update the data on the NAND flash memory. For example, it is assumed that the controller 10 receives a request to update a written file. In this case, the controller 10 reads data of a physical block including the corresponding file, and stores the data in the buffer. The controller 10 then updates the file on the buffer. The controller 10 then writes the updated file in a physical block different from the physical block in which the file was previously written. At this time, in a case where the data is written in an invalid block, the file is written after the physical block is erased.

In a case where a storage device including the plurality of memory chips 20 is used as in the present disclosure, the processing circuit 11 of the controller 10 can divide data into data fragments at the time of writing the data and write the data fragments in parallel in respective physical blocks in the memory chips 20. The size of each data fragment can be determined according to the type of the memory used or the use of the memory. For example, in a case where a NAND flash memory is used, each data fragment can be set to a size equal to a physical block or a size equal to a positive integral multiple of a physical block.

The controller 10 may set continuous block addresses across the plurality of memory chips 20. The block addresses may be the same addresses as the above-described physical block addresses. In addition, as the block addresses, addresses obtained by converting the above-described physical block addresses by a predetermined rule, formula, or the like may be used. The controller 10 may define a super block, which is a set of physical blocks selected from the memory chips 20, in order to implement the above-described processing. For example, in a case where the number of the memory chips 20 is N, a super block including N physical blocks or N×i (i is a positive integer) physical blocks can be defined. In this case, the controller 10 may erase data in a unit of a super block. Furthermore, the controller 10 may erase data in a unit of an individual physical block.

The controller 10 can use the plurality of memory chips 20, as in the cases of an interleaved memory and a striped hard disk. Therefore, it is possible to speed up the write processing and the read processing as compared with the case of using a single memory chip 20. The controller 10 does not necessarily write the data fragments in all the memory chips 20 of the storage device. For example, in a case where the number of the memory chips 20 included in the storage device is M, the data fragments may be written in a number smaller than M of memory chips 20 according to the size of the data to be written or the states of the memory chips 20.

The controller 10 may perform garbage collection in the plurality of memory chips 20. In the garbage collection processing, written data distributed and stored in pages in a plurality of valid blocks is read. The written data is then aggregated into a smaller number of blocks than before and written in the plurality of memory chips 20. As a result, the controller 10 can secure a free block that can be used for writing data.

The first encoder 14 adds a parity to the data to be written using an erasure correction code. A unit in which a parity is added can be determined according to the data size written in each of the memory chips 20 at the time of write processing. For example, the first encoder 14 can add a parity for each M (M is an integer greater than 1) blocks of data. M may be set to a value equal to the number N of the memory chips 20. Furthermore, M may be set to N/j (j is an integer greater than 1). Moreover, M may be set to a value equal to the number of physical blocks included in the above-described super block. For example, M can be set to N×i. However, the first encoder 14 may add a parity in a unit different from the above units. For example, the first encoder 14 may add a parity for each predetermined number of pages.

The first encoder 14 can perform encoding with, for example, a BCH code, an RS code, a low density parity check (LDPC) code, or a raptor code. The first encoder 14 may use any type of error correction code (ECC) as long as erasure correction can be performed. The error correction code used by the first encoder 14 is referred to as a first code.

The first decoder 15 is configured to decode data using the same type of error correction code as the first encoder 14. For example, at the time of reading data, the first decoder 15 can perform the erasure correction with the first code by using data fragments for which error correction with a second code to be described later has been completed. For example, the first decoder 15 can perform the erasure correction when error correction on M-u data fragments among M data fragments is completed. The capability of the erasure correction depends on the ratio of parities added at the time of data writing and the type of the adopted error correction code. Therefore, the number u of missing data fragments allowed at the time of erasure correction can take any integer in the range of [1, M−1]. Note that the first decoder 15 may be used to perform not only erasure correction but also error correction on data using iterative decoding or the like.

A monitoring unit 17 is, for example, a component inside the processing circuit 11. The monitoring unit 17 monitors the number of data fragments for which the error correction with the second code has been completed at the time of reading data. In the case of the configuration of FIG. 4, the monitoring unit 17 notifies the first decoder 15 when the controller 10 receives M-u data fragments, with which the first decoder 15 can perform erasure correction, from the plurality of memory chips 20. As a result, the first decoder 15 can start the erasure correction.

Figure 5:
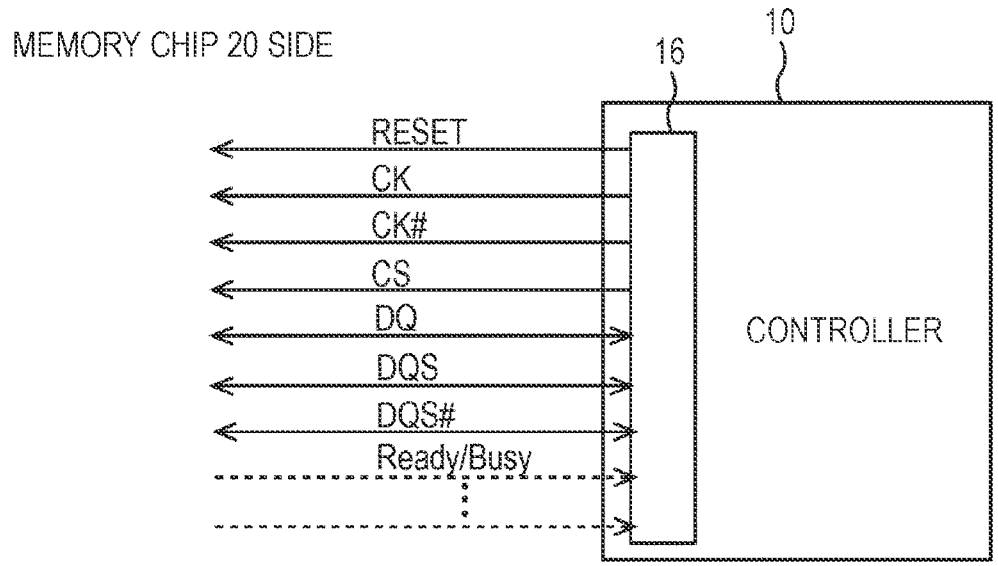
FIG. 5 is a diagram illustrating an example of signal lines included in an interface circuit.
Figure 6:
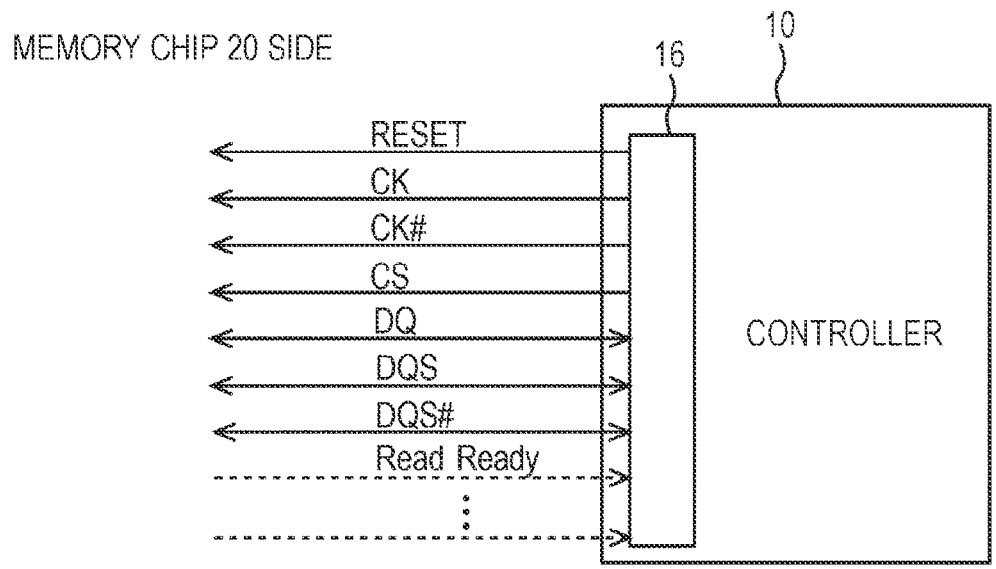
FIG. 6 is a diagram illustrating an example of signal lines included in an interface circuit according to the present disclosure.

FIGS. 5 and 6 illustrate examples of signal lines included in the first interface circuit 16. As illustrated, the controller 10 is electrically connected to the plurality of memory chips 20 via the first interface circuit 16. First, signal lines common in FIGS. 5 and 6 will be described. The controller 10 transmits a reset signal to the memory chips 20 via a signal line RESET. The controller 10 supplies a differential clock to the memory chips 20 using a signal line CK and a signal line CK #. The controller 10 transmits a chip select signal to the memory chips 20 via a signal line CS.

With the signal line DQ, a signal line DQS, and a signal line DQS #, bidirectional communication is possible between the controller 10 and the memory chips 20. The signal line DQ corresponds to a data line between the controller and the memory chips. The signal line DQS and the signal line DQS # are data strobes to which clock signals for data transfer are supplied. As in the configuration of FIG. 3, in a case where one signal line DQ is shared by the plurality of memory chips 20, data read from different memory chips 20 is serially transferred.

Signal lines Ready/Busy in FIG. 5 connect the memory chips 20 and the controller 10. Each of the memory chips 20 sets the voltage of a corresponding one of the signal lines Ready/Busy to HIGH when data stored in the memory chip 20 is being accessed. On the other hand, each of the memory chips 20 sets the voltage of the corresponding one of the signal lines Ready/Busy to LOW when the data stored in the memory chip 20 is not being accessed.

Meanwhile, FIG. 6 illustrates an example of signal lines included in the interface circuit according to the present disclosure. Similarly to the signal lines Ready/Busy, the signal lines Read Ready in FIG. 6 connect the memory chips 20 and the controller 10. The use of the signal lines Read Ready is different from that of the signal lines Ready/Busy. Each of the signal lines Read Ready indicates whether or not error correction processing on a data fragment is performed in a corresponding one of the memory chips 20. For example, each of the memory chips 20 sets the voltage of a corresponding one of the signal lines Read Ready to HIGH during the execution of error correction processing on a data fragment. On the other hand, each of the memory chips 20 can set the voltage of the corresponding one of the signal lines Read Ready to LOW when the error correction processing on the data fragments is not being performed.

The above-described method of using the signal lines Read Ready is merely an example. For example, a voltage level in which HIGH and LOW are inverted in each condition may be used. In addition, the state may be expressed by a pulse of a voltage signal or a direction of a current signal.

In the above description, a case where the memory chips 20 notify the controller 10 of the completion status of the error correction processing by use of the signal lines Read Ready has been described as an example. However, the memory chips 20 may notify the controller 10 of success or failure of the error correction by use of the signal lines Read Ready. For example, the memory chips 20 may notify the controller 10 that the error correction has succeeded by use of the signal lines Read Ready. Furthermore, the memory chips 20 may notify the controller 10 that the error correction has failed by use of the signal lines Read Ready.

The monitoring unit 17 of the controller 10 can confirm whether or not the error correction in the memory chips 20 has been completed by referring to the signal lines Read Ready. As a result, the monitoring unit 17 can obtain information regarding the processing status in the memory chips 20 by a simple method without reading registers. As a result, the processing time can be shortened. Note that it is not always necessary to prepare dedicated signal lines as the signal lines Read Ready. For example, the signal lines Read Ready may be signal lines shared for a plurality of uses.

Figure 7:
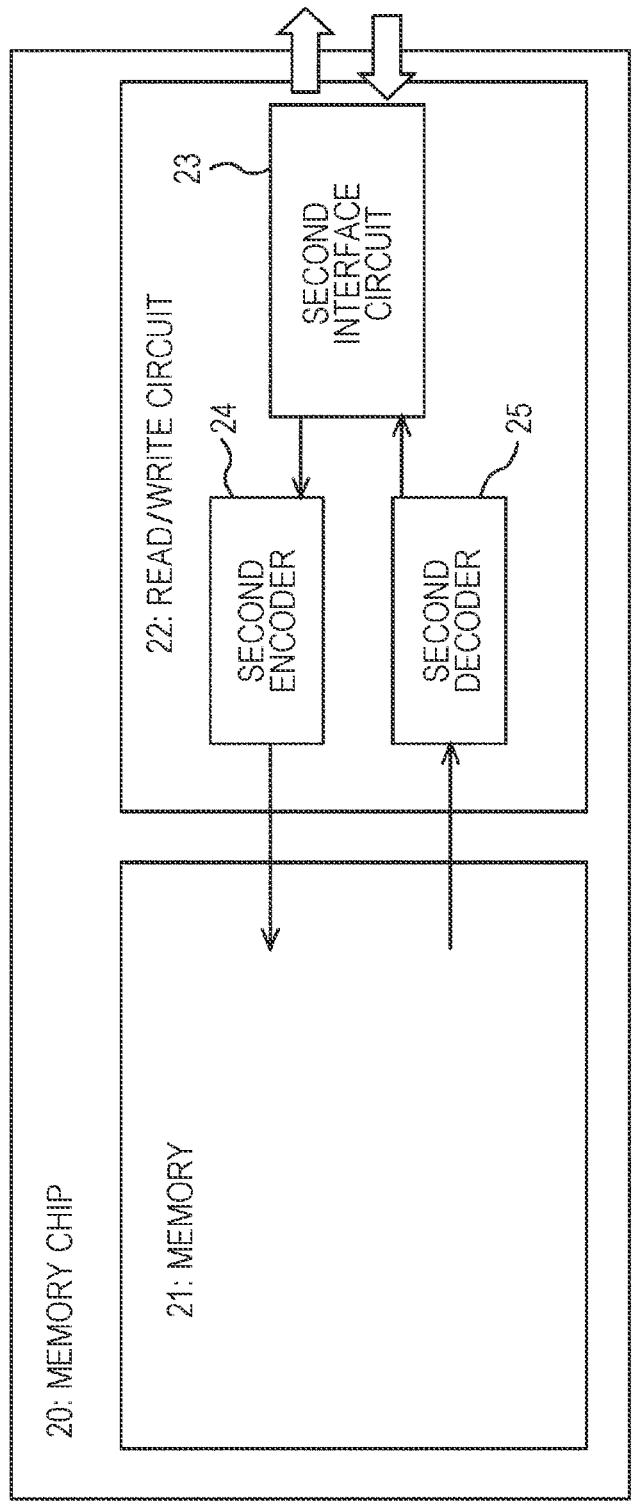
FIG. 7 is a block diagram schematically illustrating an example of a memory chip according to the present disclosure.

The block diagram of FIG. 7 schematically illustrates an example of a memory chip according to the present disclosure. The memory chip 20 in FIG. 7 includes a memory 21 and a read/write circuit 22. The memory 21 is, for example, a nonvolatile memory such as a NAND flash memory, and provides a storage area of the memory chip 20. However, the memory 21 may be another type of memory. To adjust to locality of data accesses, the memory 21 may include a hierarchical cache region. Furthermore, the memory 21 may include a buffer memory used at the time of writing and reading. As the buffer memory, for example, a volatile memory such as an SRAM or a DRAM can be used. That is, the memory 21 may include a plurality of types of memories. The read/write circuit 22 includes a second interface circuit 23, a second encoder 24, and a second decoder 25. The second interface circuit 23 is electrically connected to the first interface circuit 16 of the controller 10 via a plurality of signal lines (for example, the signal lines in FIG. 6).

The second encoder 24 adds a parity to a data fragment using an error correction code when the read/write circuit 22 receives a request to write the data fragment. For example, in a case where a data fragment having a size equal to a physical block is written in each of the memory chips 20, the second encoder 24 can perform encoding in a unit of a physical block. Furthermore, in a case where a data fragment having a size equal to i physical blocks is written in each of the memory chips 20, the second encoder 24 may perform encoding for each i physical blocks.

Moreover, the second encoder 24 may perform encoding with a granularity smaller than that of a physical block regardless of the size of a data fragment to be written in each of the memory chips 20. For example, the second encoder 24 may perform encoding in a unit of a page or in a unit of a plurality of pages. However, the granularity in the encoding by the second encoder 24 is not limited. In general, the granularity in encoding is determined according to the error occurrence rate in the memory cells, the deterioration state of the memory, the purpose of use of the storage device 100, and the like.

The second encoder 24 can use, for example, an error correction code such as a Hamming code, a cyclic code, a sparse graph code, or a convolutional code. However, the type of the error correction code used by the second encoder 24 is not limited. The error correction code used by the second encoder 24 is referred to as a second code. The second code may be the same type of code as the first code described above, or may be a different type of code.

The second decoder 25 performs error correction on a data fragment to be read when the read/write circuit 22 receives a request to read the data fragment. The second decoder 25 decodes the data fragment using the same error correction code as the second encoder 24. For example, the second encoder 24 sets the voltage of a corresponding one of the signal lines Read Ready to HIGH during execution of error correction processing on the data fragment. In this case, when the error correction processing on the data fragment is completed, the second encoder 24 sets the voltage of the corresponding one of the signal lines Read Ready to LOW. As described above, the second encoder 24 may notify the controller 10 of the completion status of the error correction processing or success or failure of the error correction processing by a method different from this method.

Figure 8:
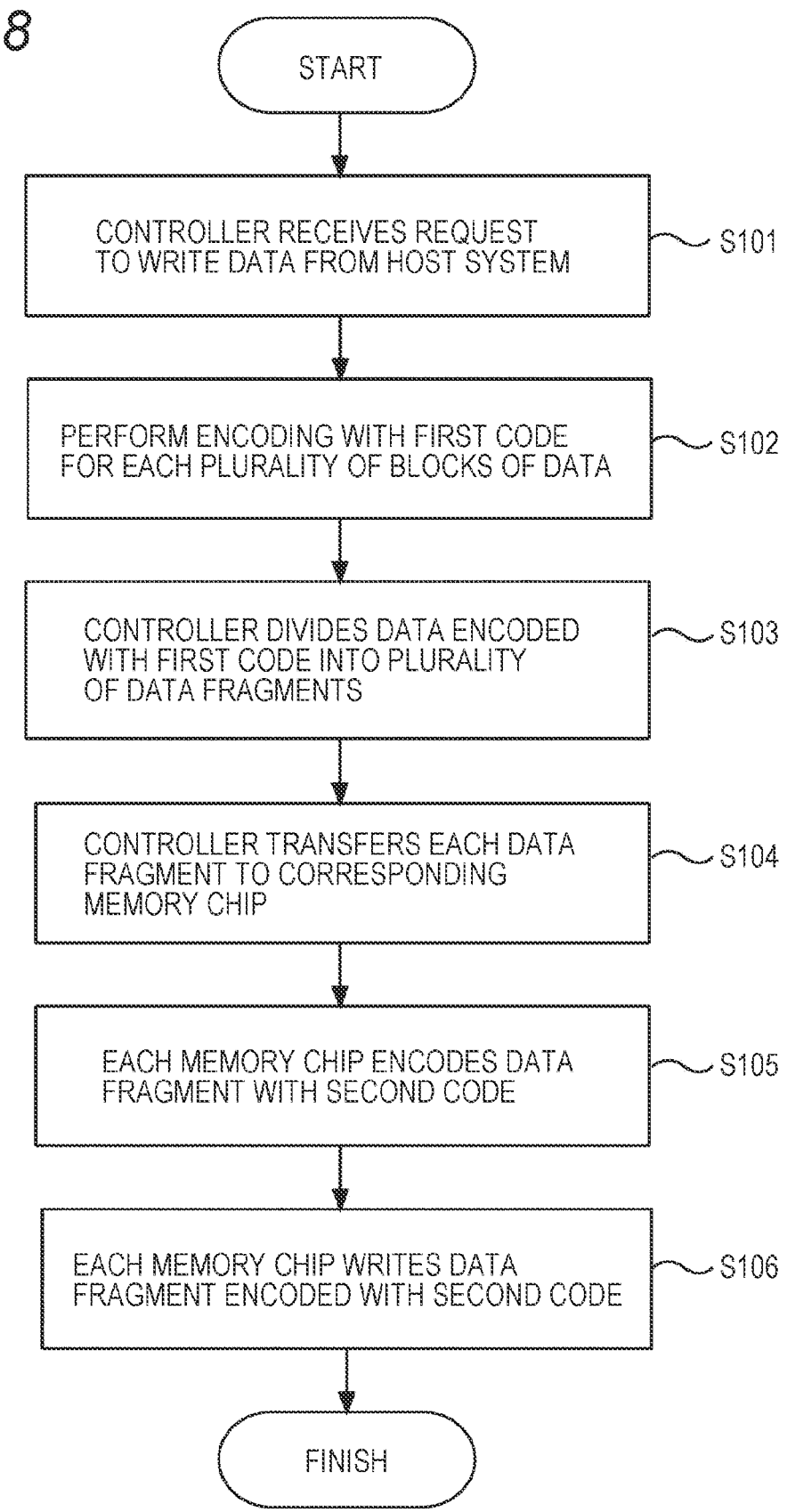
FIG. 8 is a flowchart illustrating an example of data write processing.

The flowchart of FIG. 8 illustrates an example of data write processing. Hereinafter, an example of the write processing in the storage device according to the present disclosure will be described with reference to the flowchart of FIG. 8.

First, the controller 10 receives a request to write data from the host system 2 (step S101). The first encoder 14 of the controller 10 then performs encoding with the first code for each plurality of (for example, M) blocks of data (step S102). Next, the processing circuit 11 of the controller 10 divides the data encoded with the first code into a plurality of data fragments (step S103). For example, the number of divisions of the data (the size of a data fragment) can be determined according to the size of a physical block used in the memory chips 20 and the number of physical blocks written in the same memory chip 20. The controller 10 may temporarily store the data fragments in the write buffer.

The controller 10 then transfers each data fragment to a corresponding one of the memory chips 20 (step S104). Here, the controller 10 may refer to the above-described lookup table 12 and convert a logical block address designated by the host system 2 into a physical block address. By obtaining the physical block address, the controller 10 can specify one of the memory chips 20 and a physical block in the memory chip 20, each of which serves as a transfer destination of a data fragment. Furthermore, the controller 10 may refer to the above-described block management table 13 and search for a physical block in which the data can be written.

Next, the second encoder 24 of each of the memory chips 20 encodes the data fragment with the second code (step S105). The second encoder 24 may encode the data fragment stored on the buffer memory and add a parity. Each of the memory chips 20 then stores the data fragment encoded with the second code in the memory 21. The encoded data fragment written in the memory 21 may have a size of one physical block or a size of a plurality of physical blocks. Finally, each of the memory chips 20 stores the data fragment encoded with the second code in the storage area in the memory 21 (step S106).

The write processing in the storage device according to the present disclosure has been described above. Hereinafter, the read processing in the storage device according to the present disclosure will be described.

Figure 9:
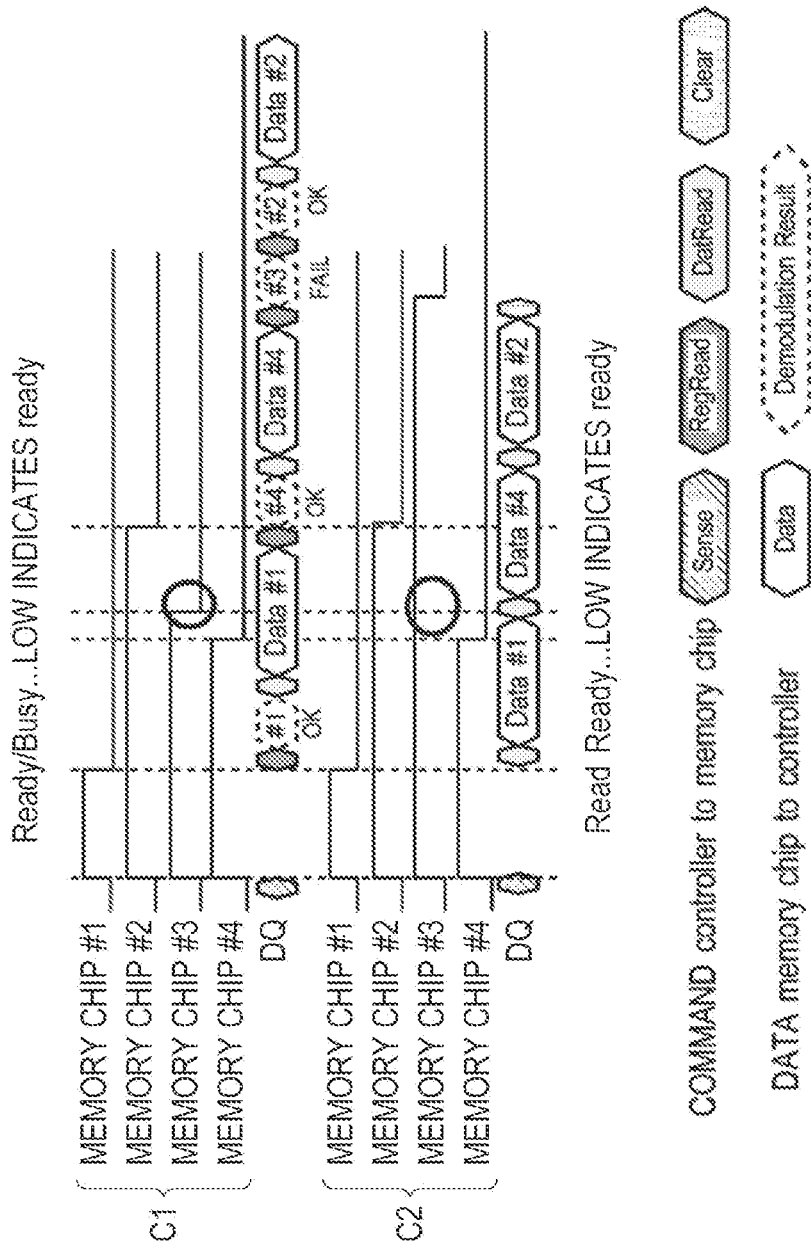
FIG. 9 is a timing chart illustrating an example of an operation after a request to read data fragments is made to a plurality of memory chips.

FIG. 9 is a timing chart illustrating an operation example after a request to read data fragments is made to a plurality of memory chips. FIG. 9 illustrates an operation when the data fragments are read from four memory chips of memory chips #1 to #4. A timing chart C1 in FIG. 9 illustrates an operation in a storage device including the signal lines Read/Busy in FIG. 5. Meanwhile, a timing chart C2 in FIG. 9 illustrates an operation in a storage device including the signal lines Read Ready in FIG. 6.

The timing chart C1 illustrates voltage levels in the signal lines Ready/Busy. Meanwhile, the timing chart C1 illustrates voltage levels in the signal lines Read Ready. In any of the signal lines, LOW indicates a ready state (a state in which reading is possible) of a corresponding memory chip. Furthermore, the timing charts C1 and C2 illustrate commands and data transferred by use of the signal line DQ.

In the timing chart C1, the controller 10 transmits a Sense command to the memory chips #1 to #4. The controller 10 then sequentially transmits a RegRead command to each memory chip. In the example of FIG. 9, the controller 10 refers to the signal lines Ready/Busy and transmits the RegRead command in the order in which the memory chips transition to the ready state.

The controller 10 can acquire the value of a register indicating success or failure of error correction processing by the second decoder 25 by transmitting the RegRead command. The register is mounted on, for example, the read/write circuit 22 of each memory chip. The controller 10 then refers to the value of the register and transmits a DatRead command to a memory chip that has succeeded in the error correction. In the example of FIG. 9, the error correction fails in the memory chip #3, and the error correction succeeds in the other memory chips. Therefore, the controller 10 transmits the DatRead command to the memory chips #1, #2, and #4. In response to the DatRead command, the memory chips #1, #2, and #4 transmit data fragments (Data #1, Data #4, and Data #2) to the controller 10. After receiving the data fragments from the memory chips, the controller 10 transmits a Clear command to the memory chips.

Also in the timing chart C2, the controller 10 transmits the Sense command to the memory chips #1 to #4. However, the controller 10 does not transmit the RegRead command to the memory chips. Instead, the controller 10 refers to the signal lines Read Ready and transmits the DatRead command to the memory chips in the order in which the error correction has been completed. In the example of FIG. 9, since the error correction processing in the memory chip #3 is delayed, the DatRead command is transmitted to the other memory chips. In response, the controller 10 receives the data fragments (Data #1, Data #4, and Data #2) from the other memory chips. After receiving the data fragments from the memory chips, the controller 10 transmits the Clear command to the memory chips.

In the storage device according to the present disclosure, the signal lines Read Ready are referred to and data fragments are read from memory chips for which error correction has been completed. Therefore, it is not necessary to read values of registers in order to confirm decoding results. It is possible to reduce the latency at the time of reading data distributed and stored in a plurality of memory chips and to speed up the overall read processing.

Figure 10:
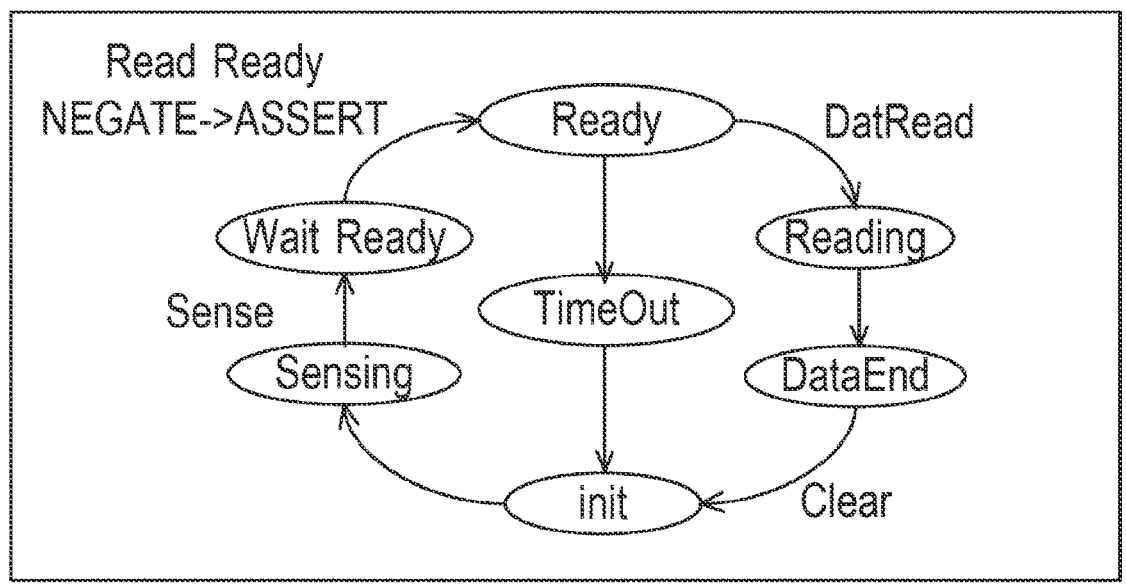
FIG. 10 is a diagram illustrating an example of state transition in the controller.

FIG. 10 illustrates an example of state transition in the controller according to the present disclosure. FIG. 10 illustrates commands serving as conditions for transition between states and states of a signal line. For example, when the controller 10 issues the DatRead command to a memory chip in the Ready state, the memory chip transitions to a Reading state. When the reading of a data fragment is completed, the memory chip transitions to a DataEnd state. When the controller 10 transmits the Clear command to the memory chip in the DataEnd state, the memory chip transitions to an init state. The memory chip then transitions to a Sensing state after a certain period of time elapses.

When the controller 10 transmits the Sense command to the memory chip in the Sensing state, the memory chip transitions to a WaitReady state. When the voltage of a corresponding one of the signal lines Read Ready changes from HIGH to LOW, the memory chip then transitions to the Ready state. The controller 10 can manage the state of each memory chip and maintain processing consistency. Note that the state transition of the memory chip may be different from that illustrated in FIG. 10.

Figure 11:
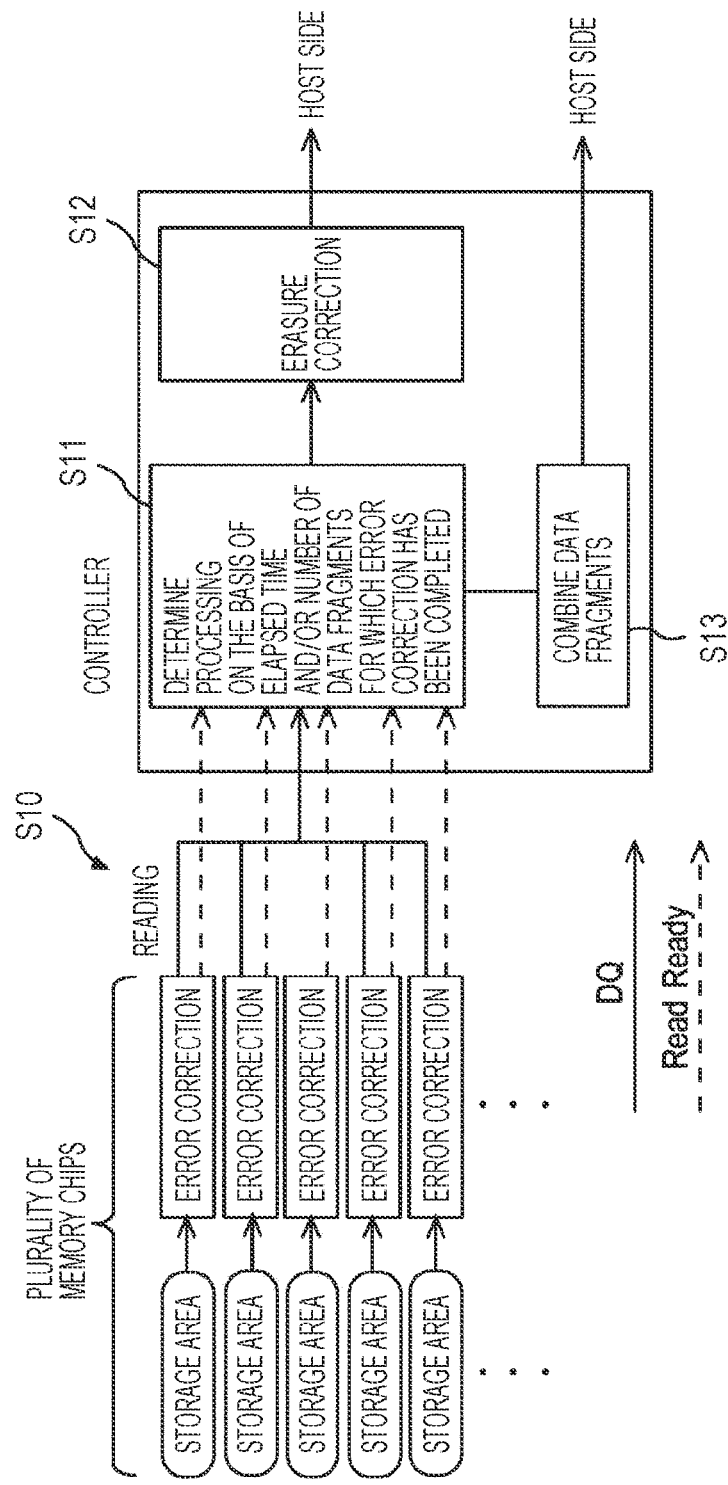
FIG. 11 is a diagram conceptually illustrating a data flow at the time of reading.

FIG. 11 conceptually illustrates a data flow at the time of reading in a case where the signal line DQ is shared by a plurality of memory chips as in the configuration of FIG. 3. First, error correction processing is performed on the plurality of memory chips, and sequential read processing is performed on memory chips for which the error correction processing has been completed (step S10). The controller 10 can then determine processing contents on the basis of the time elapsed from the start of the read processing and/or the number of data fragments for which the error correction has been completed (step S11).

For example, in a case where the error correction on all the data fragments is completed within a predetermined time from the reception of a read request from the host system 2, the processing circuit 11 of the controller 10 combines the data fragments and reconfigures data to be read (step S13). The reconfigured data is transferred to the host system 2. Furthermore, in a case where the error correction on such a number of data fragments that the first encoder 14 can perform erasure correction is completed within the predetermined time from the reception of the read request from the host system 2, the erasure correction is performed (step S12). The data reconfigured by the erasure correction is transferred to the host system 2. Note that, in a case where none of the above conditions is satisfied within the predetermined time from the reception of the read request from the host system 2, the controller 10 may interrupt the read processing and notify the host system 2 of the read failure.

Figure 12:
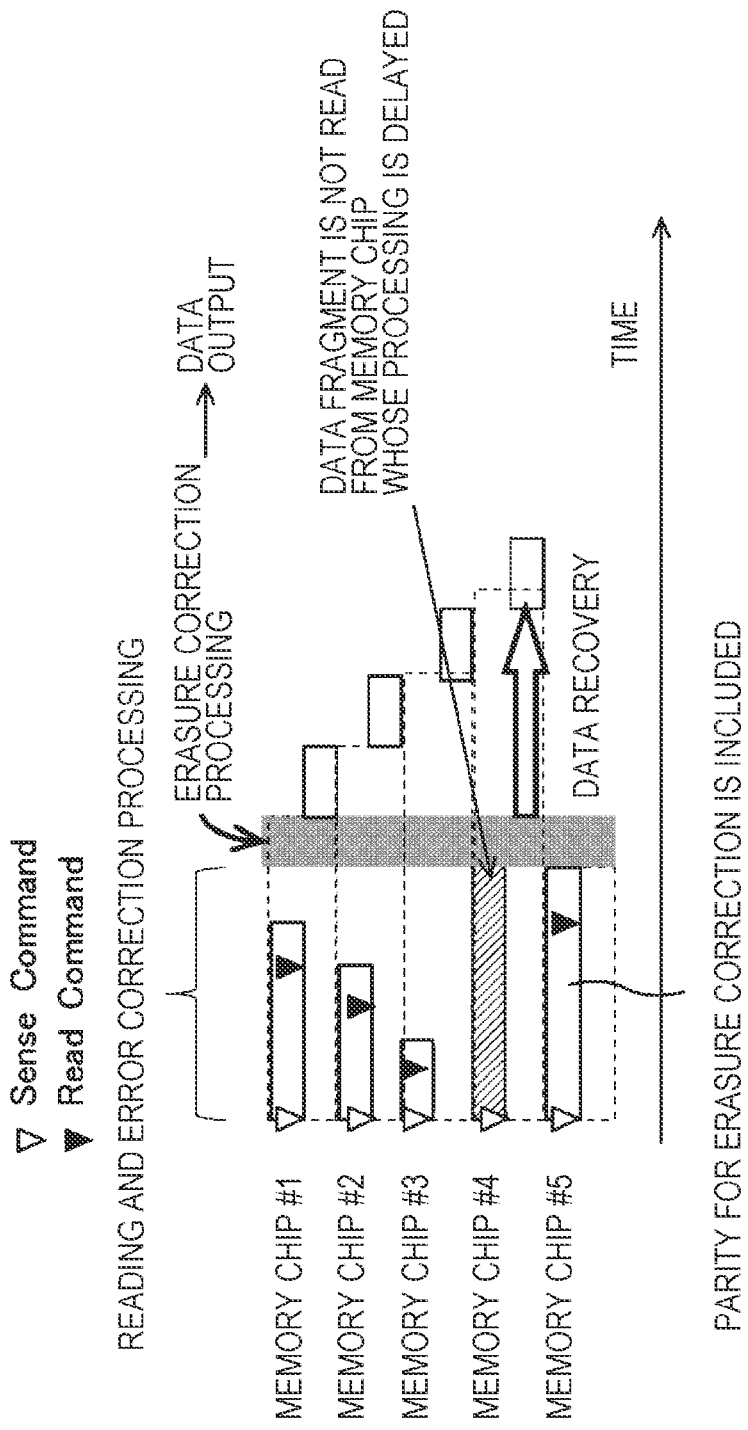
FIG. 12 is a diagram illustrating an example of an execution timing of erasure correction processing.

The timing chart of FIG. 12 illustrates an example of an execution timing of the erasure correction processing. The horizontal axis in FIG. 12 indicates time. In FIG. 12, the Sense command is issued to chips #1 to #5. Among the chips #1 to #5, the chips #1 to #3 and the chip #5 have undergone the error correction processing by the second encoder 24 and transition to the Ready state. At this time, the voltages of corresponding ones of the signal lines Read Ready are set to LOW. Therefore, the controller 10 issues a Read command to the chips #1 to #3 and the chip #5. On the other hand, since the chip #4 does not transition to the Ready state, the voltage of a corresponding one of the signal lines Read Ready remains HIGH. Therefore, the controller 10 does not issue the Read command to the chip #4.

As a result, the controller 10 can read data fragments each including a parity for erasure correction from the chips #1 to #3 and the chip #5. The first encoder 14 of the controller 10 performs the erasure correction using the read data fragments and recovers the data. The recovered data is transferred to the host system 2.

As described above, performing the erasure correction without waiting for reading of a data fragment from a memory chip whose processing is delayed makes it possible to reduce the influence of the processing delay in a part of the memory chips and speed up the overall read processing in the storage device.

Figure 13:
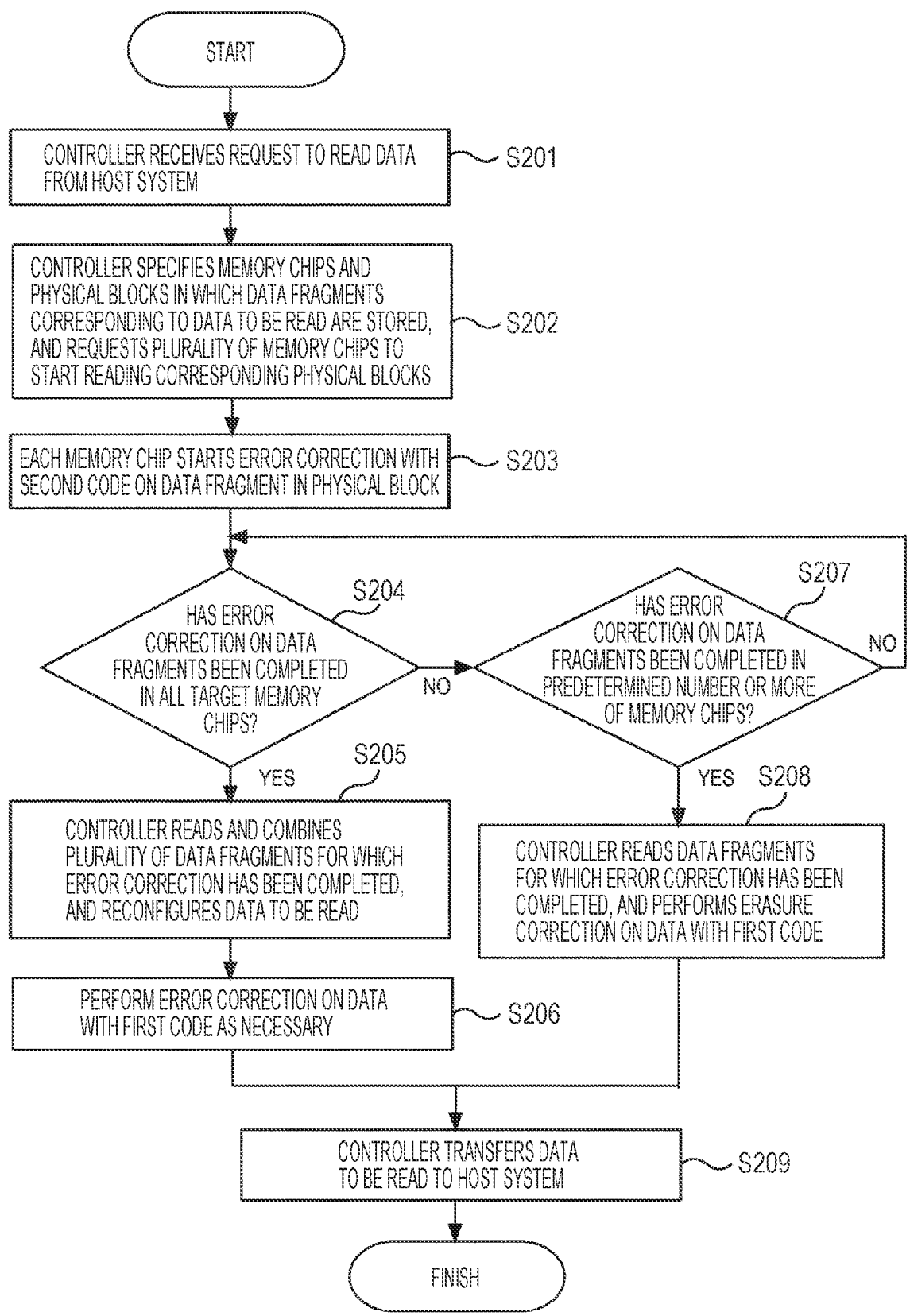
FIG. 13 is a flowchart illustrating an example of data read processing.

The flowchart of FIG. 13 illustrates an example of data read processing. Hereinafter, an example of the read processing in the storage device according to the present disclosure will be described with reference to the flowchart of FIG. 13.

First, the controller 10 receives a request to read data from the host system 2 (step S201). The controller 10 then refers to the lookup table 12, specifies target memory chips among the memory chips 20 and physical blocks in which a plurality of data fragments corresponding to the data to be read is stored, and requests the plurality of memory chips to start reading the corresponding physical blocks (step S202). Next, the second decoder 25 of each of the memory chips 20 starts the error correction with the second code on a data fragment in a physical block (step S203). Here, each of the memory chips 20 can notify the controller 10 that the error correction on the data fragment has been completed via a signal line (for example, the above-described signal lines Read Ready or the like).

The controller 10 then determines whether or not the error correction on the data fragments has been completed in all the target memory chips 20 (step S204). For example, in a case where the data fragments corresponding to the data to be read are stored in all the memory chips 20 of the storage device 100, the controller 10 confirms whether or not the error correction on the data fragments has been completed in all the memory chips 20 in step S204. On the other hand, in a case where the data fragments corresponding to the data to be read are stored in a part of the memory chips 20 of the storage device 100, the controller 10 is only required to confirm whether or not the error correction on the data fragments has been completed for the part of the memory chips 20 in step S204.

The processing branches depending on the determination result in step S204. In a case where the error correction on the data fragments is completed in all the target memory chips 20 (YES in step S204), the processing circuit 11 of the controller 10 reads and combines the plurality of data fragments for which the error correction has been completed, and reconfigures the data to be read (step S205). For example, as illustrated in the timing chart C2 in FIG. 9, the controller 10 may read the data fragments in the order in which the completion of the error correction on the data fragments has been confirmed in the memory chips 20. However, the controller 10 may read the data fragments at a timing different from this timing. Note that, in a case where the data fragments are sequentially read from the respective memory chips 20, the order in which the data fragments are read is not limited. For example, the controller 10 can arrange the plurality of data fragments on buffer memories or cache memories, and reconfigure the data.

The first decoder 15 of the controller 10 can then perform error correction on the reconfigured data with the first code as necessary (step S206). However, the controller 10 may omit the processing of step S206. Finally, the controller 10 transfers the data to be read to the host system 2 (step S209).

In a case where the error correction on the data fragments is not completed in all the target memory chips 20 (NO in step S204), the controller 10 determines whether or not the error correction on the data fragments has been completed in a predetermined number of memory chips 20 (step S207). Here, as the predetermined number, the number M-u of data fragments, which is necessary for the first decoder 15 to perform the erasure correction, can be used. However, an integer value larger than this may be used in step S207.

The processing branches depending on the determination result in step S207. In a case where the number of the memory chips 20 for which the error correction on the data fragments has been completed is less than the predetermined number (NO in step S207), the controller 10 executes the determination in step S204 again. In a case where the error correction on the data fragments is completed in the predetermined number of memory chips 20 (YES in step S207), the controller 10 reads the data fragments for which the error correction has been completed, and performs the erasure correction on the data with the first code by using the first decoder 15 (step S208). For example, the controller 10 may arrange the data fragments on the buffer memories or cache memories to perform the erasure correction. Finally, the controller 10 transfers the data subjected to the erasure correction to the host system 2 (step S209).

Figure 14:
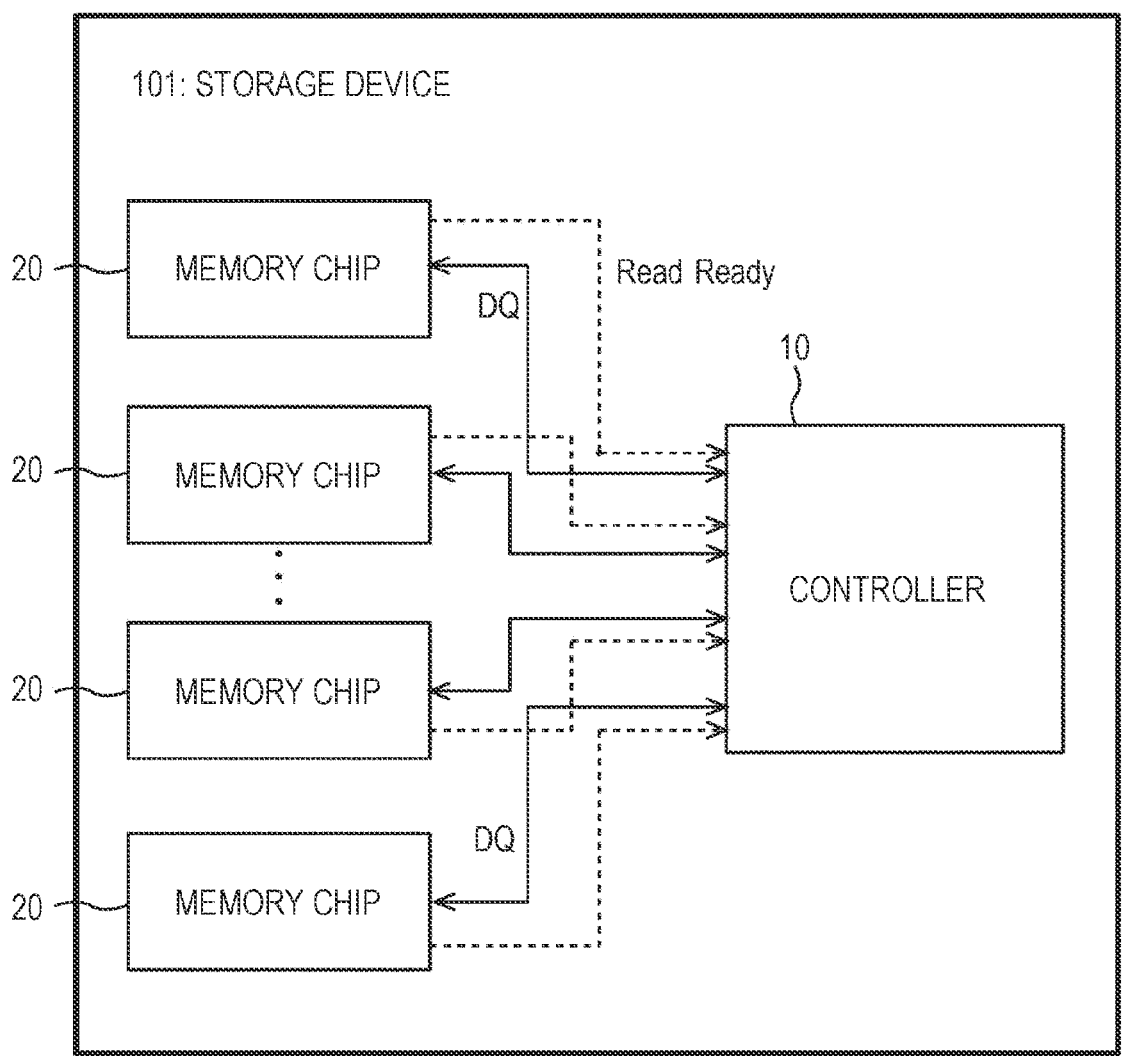
FIG. 14 is a block diagram schematically illustrating an example of a storage device according to a first modification.

The block diagram of FIG. 14 schematically illustrates an example of a storage device according to a first modification. FIG. 14 illustrates a configuration example of wiring between the controller 10 and the plurality of memory chips 20 in a storage device 101. Signal lines DQ (solid lines in FIG. 14) correspond to data lines between the memory chips 20 and the controller 10. In FIG. 14, the controller 10 is connected to each of the memory chips 20 via an individual one of the signal lines DQ. Furthermore, as in the storage device 100 in FIG. 3, the controller 10 is connected to each of the memory chips 20 via an individual one of signal lines Read Ready. In this manner, the controller according to the present disclosure may be connected to the plurality of memory chips 20 by individual data lines. When the configuration of FIG. 14 is adopted, the controller 10 can perform data transmission with the plurality of memory chips in parallel. The signal lines DQ may be shared for use in data reading and data writing. Furthermore, separate signal lines may be prepared for use in data reading and data writing.

Note that the storage device according to the present disclosure may include another signal line not illustrated in FIG. 14. Furthermore, the wiring of the data lines and the signal lines Read Ready illustrated in FIG. 14 is merely an example. Therefore, the wiring of the data line and the signal lines Read Ready may be different from this wiring.

Figure 15:
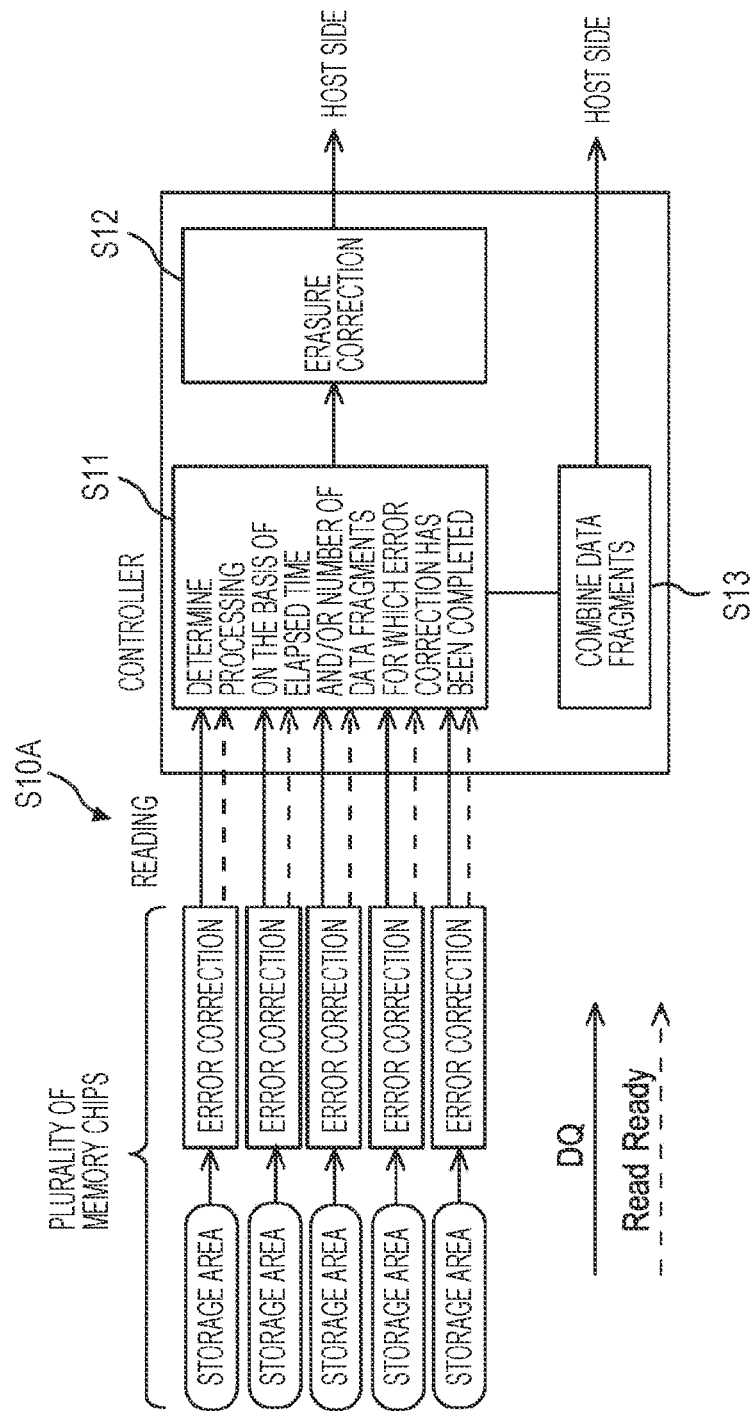
FIG. 15 is a flowchart illustrating an example of read processing of the storage device according to the first modification.

FIG. 15 conceptually illustrates a data flow at the time of reading in a case where the signal lines DQ are each prepared for one memory chip as in the example of FIG. 14. First, error correction processing is performed on a plurality of memory chips, and read processing is performed on the memory chips 20 for which the error correction processing has been completed (step S10A). In step S10A, the read processing may be performed in parallel for the plurality of memory chips 20. The controller 10 then determines processing contents on the basis of the time elapsed from the start of the read processing and/or the number of data fragments for which the error correction has been completed (step S11).

For example, in a case where the error correction on all the data fragments is completed within a predetermined time from the reception of a read request from the host system 2, the processing circuit 11 of the controller 10 combines the data fragments and reconfigures data to be read (step S13). The reconfigured data is transferred to the host system 2. Furthermore, in a case where the error correction on such a number of data fragments that the first encoder 14 can perform erasure correction is completed within the predetermined time from the reception of the read request from the host system 2, the erasure correction is performed (step S12). The data reconfigured by the erasure correction is transferred to the host system 2. Note that, in a case where none of the above conditions is satisfied within the predetermined time from the reception of the read request from the host system 2, the controller 10 may interrupt the read processing and notify the host system 2 of the read failure. The data flow of FIG. 15 is similar to that of FIG. 11 except for step S10A.

Figure 16:
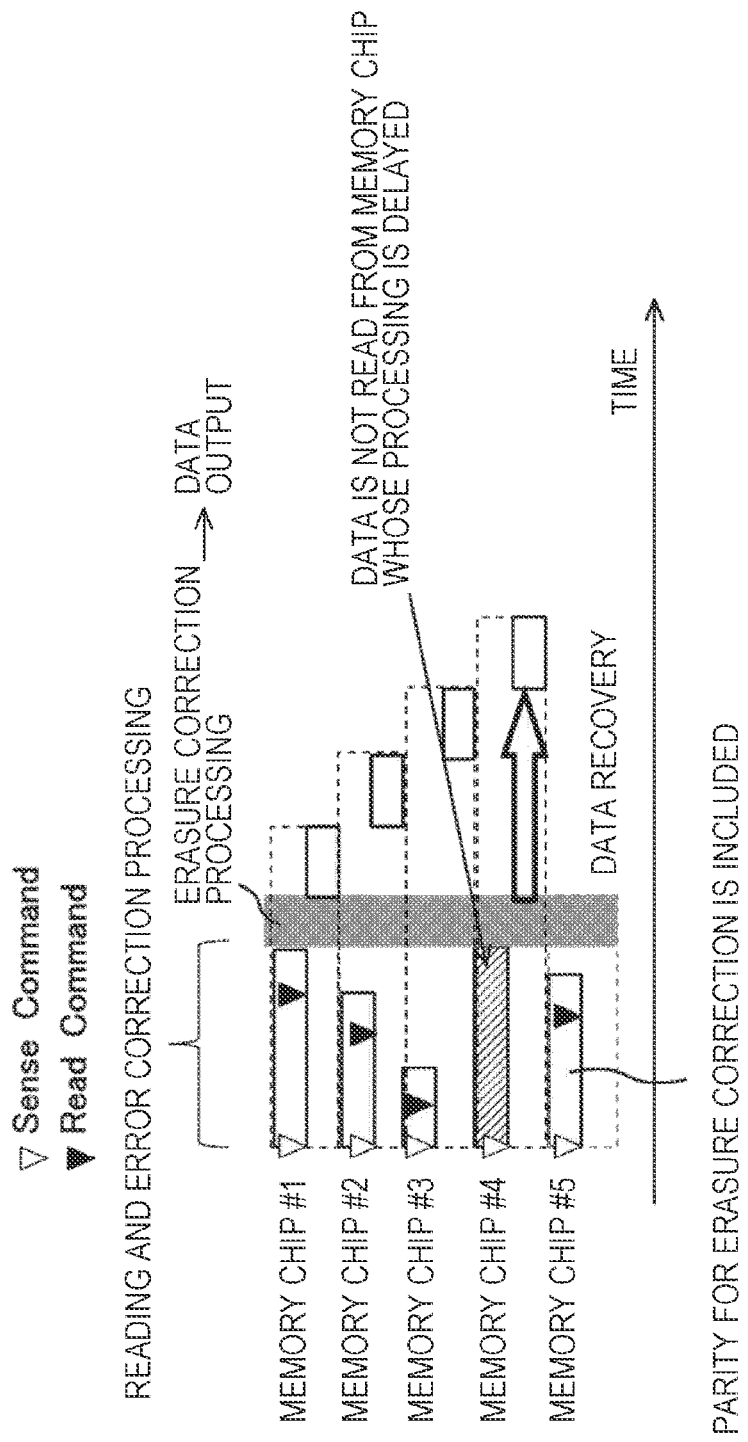
FIG. 16 is a timing chart illustrating an example of an execution timing of erasure correction processing in the storage device according to the first modification.

The timing chart of FIG. 16 illustrates an example of an execution timing of the erasure correction processing in the storage device according to the first modification. The horizontal axis in FIG. 16 indicates time. In the timing chart of FIG. 16, as in the example of FIG. 12, only the chip #4 does not transition to the Ready state, and the voltage of a corresponding one of the signal lines Read Ready remains HIGH. Therefore, the controller 10 reads data fragments each including a parity for erasure correction from the chips #1 to #3 and the chip #5. The first encoder 14 of the controller 10 performs the erasure correction using the read data fragments. The recovered data is transferred to the host system 2.

The controller according to the first modification can read the data fragments in parallel from the plurality of memory chips 20 using the plurality of data lines (signal lines DQ). Therefore, in the timing chart of FIG. 16, the required time is shorter than that of FIG. 12. Even in the storage device in which the data lines are wired as illustrated in FIG. 14, it is possible to perform erasure correction without waiting for reading of a data fragment from a memory chip whose processing is delayed. The influence of the processing delay in a part of the memory chips can be reduced, and the overall read processing in the storage device can be speeded up.

In the above description, the case where the memory chips 20 notify the controller 10 of the status of the error correction with the second code has been described as an example. However, the controller 10 may notify the host system 2 of the status of the error correction in the memory chips 20.

For example, for the purpose of efficient utilization of a nonvolatile memory, performance improvement of the storage device, or the like, at least a part of block management or control of the memory chips 20 may be performed on the side of the host system 2. In such a case, the controller 10 can notify the host system 2 of the status of the error correction in the plurality of memory chips 20 via the bus 3 in FIG. 1 or the network 5 in FIG. 2. For example, the controller 10 can notify the host system 2 of information regarding the memory chips 20 for which the error correction has been completed or information regarding the memory chip 20 for which the error correction has not been completed. Furthermore, the controller 10 may notify the host system 2 of the results of the error correction in the memory chips 20.

The host system 2, which has received the notification, can then transmit, to the controller 10, an instruction to read the data fragments from the memory chips 20, execute the erasure correction, or stand by for a certain period of time, for example. Even in a case where at least a part of the above-described processing executed by the controller 10 is executed by the host system 2, it is possible to speed up the entire read processing in the storage device.

Figure 17:
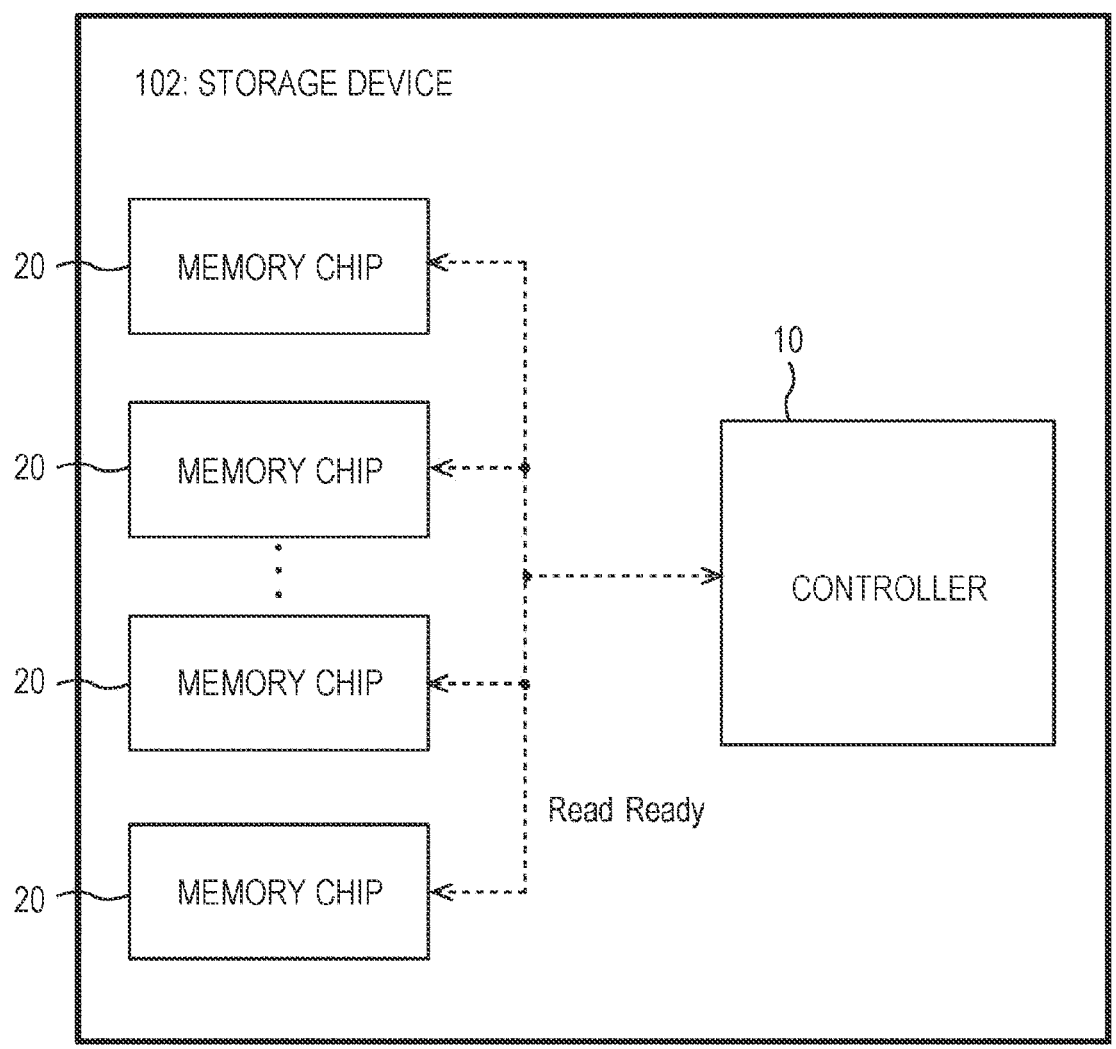
FIG. 17 is a block diagram illustrating a wiring example of a signal line Read Ready.

The block of FIG. 17 illustrates a wiring example of a signal line Read Ready. In a storage device 102 in FIG. 17, one signal line Read Ready connected to the controller 10 is branched and connected to the plurality of memory chips 20. As described above, notification of the completion status of the error correction or the success or failure of the error correction in the plurality of memory chips 20 may be made via a common signal line. In a case where the configuration of FIG. 17 is adopted, each of the memory chips 20 can transmit, to the controller 10, a signal including the completion status of the error correction or the success or failure of the error correction together with the identifier of the memory chip 20.

Hereinafter, an outline of a configuration of a controller according to the present disclosure will be described.

A controller according to the present disclosure may include a processing circuit, a first encoder, and a first decoder. The processing circuit is configured to write each of a plurality of data fragments each including a part of data to be written in one memory chip of a plurality of memory chips each having an error correction function, and read the data fragments corresponding to the data to be read from the memory chips. The first encoder is configured to encode the data to be written with an erasure correction code such that each of the data fragments includes a parity. The first decoder is configured to perform erasure correction by use of a part of the data fragments corresponding to the data to be read according to a completion status or success or failure of error correction on a corresponding part of the data fragments in each of the memory chips, which is acquired via a signal line.

The processing circuit may be configured to refer to the signal line and read the data fragments from the memory chips in an order in which the error correction has been completed. The first decoder may be configured to perform the erasure correction when the processing circuit reads a part of the data fragments from a part of the memory chips among the memory chips in which the data fragments have been written. The first decoder may be configured to perform the erasure correction by use of a part of the data fragments read by the processing circuit when at least one of the memory chips is performing the error correction. The processing circuit may be configured to notify a host system of the completion status or the success or failure of the error correction on the corresponding part of the data fragments in each of the memory chips.

An outline of a configuration of a storage device according to the present disclosure will also be described.

A storage device according to the present disclosure may include a plurality of memory chips each having an error correction function and a controller. The controller is configured to encode data to be written with an erasure correction code such that each of a plurality of data fragments obtained by dividing the data includes a parity, divide the data into the plurality of data fragments, and write each of the data fragments in one memory chip of the plurality of memory chips. Furthermore, the controller is configured to perform erasure correction by use of a part of the data fragments among the data fragments corresponding to the data to be read according to a completion status or success or failure of error correction on a corresponding part of the data fragments in each of the memory chips, which is acquired via a signal line. The controller may be configured to perform the erasure correction by use of a read part of the data fragments when at least one of the memory chips is performing the error correction.

In the storage device according to the present disclosure, the memory chips may include a second encoder and a second decoder. The second encoder is configured to encode the data fragments written by the controller with an error correction code and then store the data fragments in memory cells. The second decoder is configured to perform error correction on the data fragments corresponding to the data to be read and notify the controller of a completion status or success or failure of the error correction via the signal line.

In the storage device according to the present disclosure, the controller may be electrically connected to the plurality of memory chips via individual data lines. The controller may be electrically connected to the plurality of memory chips via a common data line. The memory chips may include a NAND flash memory. The controller may be configured to notify a host system of the completion status or the success or failure of the error correction on the corresponding part of the data fragments in each of the memory chips.

The storage device according to the present disclosure may further include an interface conversion circuit. The interface conversion circuit is configured to convert the data read by the controller into a packet capable of being transferred by a network and convert the packet received from the network into a format capable of being input to the controller.

Hereinafter, an example of a storage device in which the arrangement of encoders and decoders is different from that described above will be described.

Figure 18:
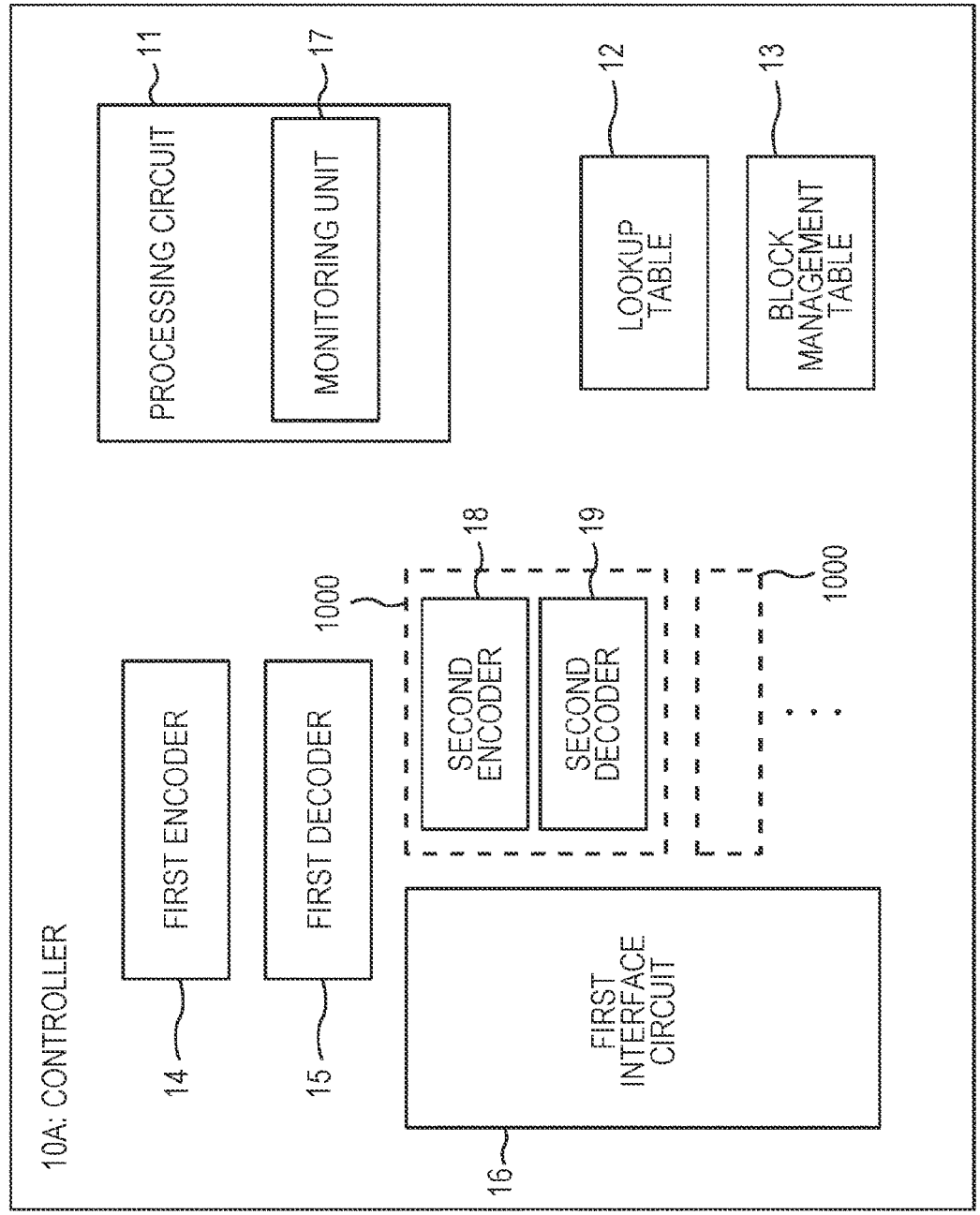
FIG. 18 is a block diagram schematically illustrating an example of a controller according to a second modification.

The block diagram of FIG. 18 schematically illustrates an example of a controller according to a second modification. A controller 10A in FIG. 18 includes a second encoder 18 and a second decoder 19 in addition to the components of the controller 10 in FIG. 4. The second encoder 18 and the second decoder 19 have functions corresponding to the second encoder 24 and the second decoder 25 of the memory chip 20 in FIG. 7, respectively. That is, in the storage device according to the present disclosure, the processing of encoding with the second code and the processing of error correction (decoding) with the second code may be performed on the controller side. Note that, in a case where the encoding processing with the second code and the error correction processing with the second code are executed on the controller side, the signal lines Read Ready between the memory chips and the controller can be omitted.

The controller 10A may include a plurality of pairs of the second encoder 18 and the second decoder 19. In FIG. 18, a circuit block 1000 includes a pair of the second encoder 18 and the second decoder 19. For example, M circuit blocks 1000, whose number is equal to the number of the memory chips 20, may be prepared such that the controller 10A connected to each of the memory chips via an individual data line can use a pair of the second encoder 18 and the second decoder 19 dedicated for writing and reading in a corresponding one of the memory chips. With this configuration, it is possible to prevent the second encoder 18 and the second decoder 19 from becoming a processing bottleneck when writing or reading is performed in parallel. However, the number of the second encoders 18 and the second decoders 19 included in the controller 10A is not limited.

Figure 19:
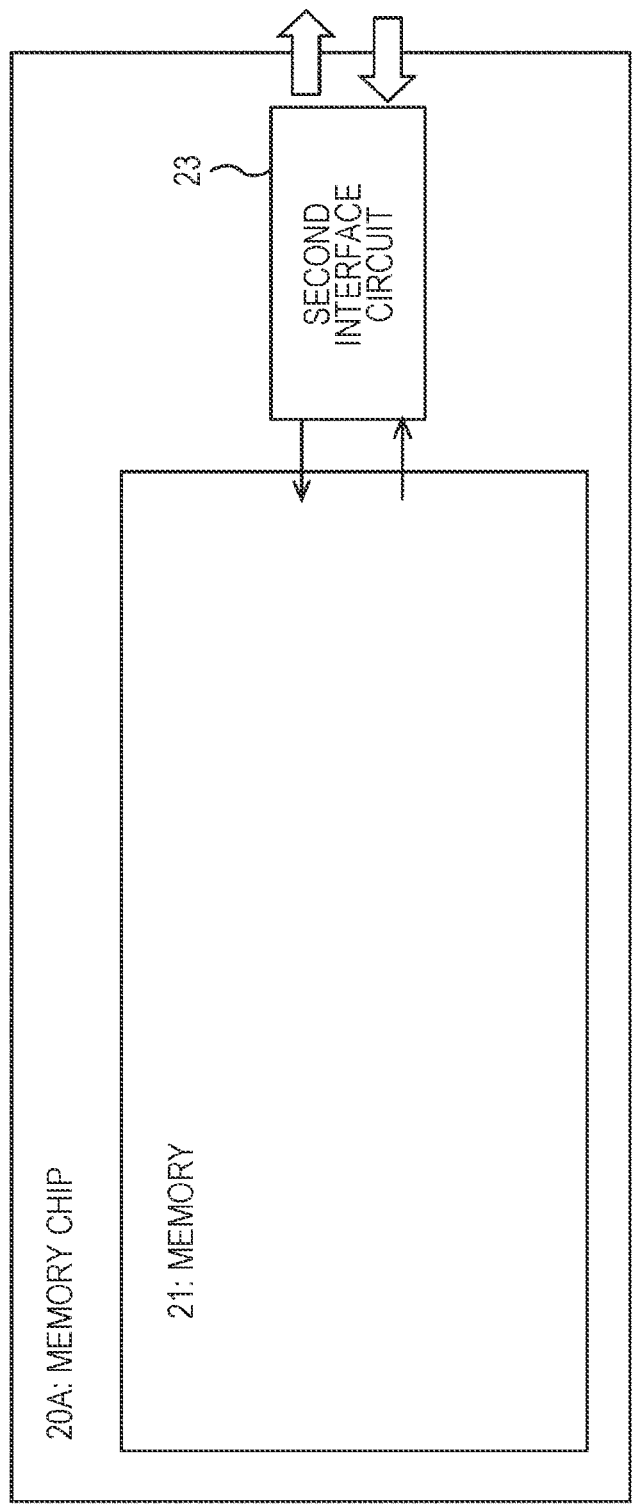
FIG. 19 is a block diagram schematically illustrating an example of a memory chip according to the second modification.

The block diagram of FIG. 19 schematically illustrates an example of a memory chip according to the second modification. A memory chip 20A in FIG. 19 includes the memory 21 and the second interface circuit 23. As illustrated in FIG. 18, in a case where the second encoder and the second decoder are arranged on the controller side, the second encoder and the second decoder on the memory chip side may be omitted. The configuration and function of the memory chip 20A are similar to those of the memory chip 20 in FIG. 7 except that the second encoder 24 and the second decoder 25 are omitted.

Figure 20:
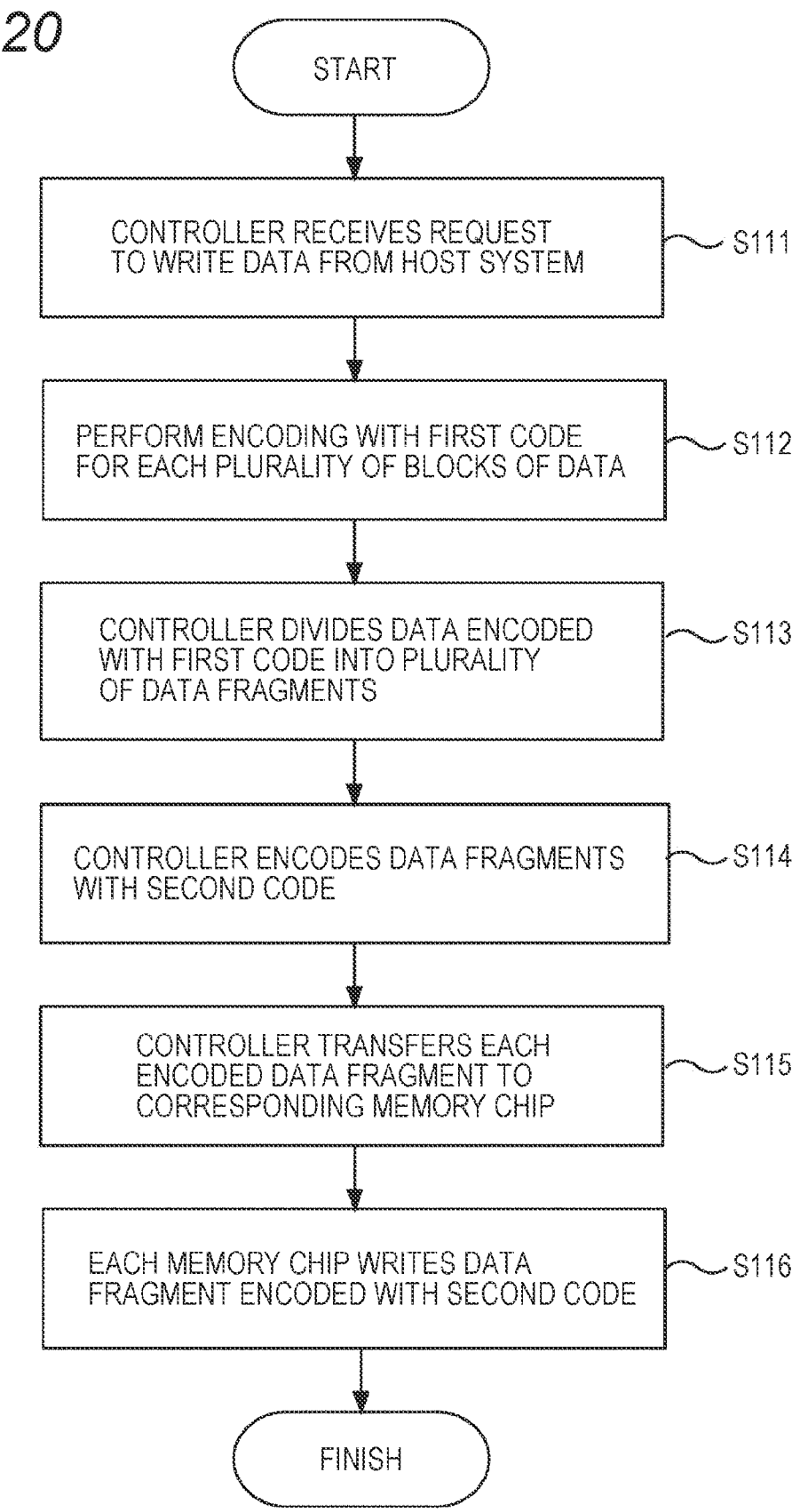
FIG. 20 is a flowchart illustrating an example of data write processing in the second modification.

The flowchart of FIG. 20 illustrates an example of data write processing in the second modification. Hereinafter, an example of the write processing in the storage device according to the present disclosure will be described with reference to the flowchart of FIG. 20.

First, the controller 10A receives a request to write data from the host system 2 (step S111). The first encoder 14 of the controller 10A then performs encoding with the first code for each plurality of (for example, M) blocks of data (step S112). Next, the processing circuit 11 of the controller 10A divides the data encoded with the first code into a plurality of data fragments (step S113). For example, the number of divisions of the data (the size of a data fragment) can be determined on the basis of the size of a physical block used in the memory chips 20A and the number of physical blocks written in the same memory chip 20A. The controller 10A may temporarily store the data fragments in the write buffer.

The second encoder 18 of the controller 10A then encodes the data fragments with the second code (step S114). The granularity in the encoding by the second encoder 18 can be determined on the basis of the data size written in each of the memory chips 20A. For example, in a case where the data fragments written in the memory chips 20A each have a size equal to the size of a physical block, the encoding may be performed in a unit of a physical block or in a unit of 1/s (s is an integer greater than 1) of a physical block. Furthermore, in a case where the data fragments written in the memory chips 20A each have a size equal to the size of i physical blocks, the encoding can be performed for each i physical blocks, for each physical block, or in a unit of 1/s of a physical block. However, the granularity in the encoding by the second encoder 18 may be different from this.

Next, the controller 10A transfers each encoded data fragment to a corresponding one of the memory chips 20A (step S115). Here, the controller 10A may refer to the above-described lookup table 12 and convert a logical block address designated by the host system 2 into a physical block address. By obtaining the physical block address, the controller 10A can specify one of the memory chips 20A and a physical block in the memory chip 20A, each of which serves as a transfer destination of a data fragment. Furthermore, the controller 10A may refer to the above-described block management table 13 and search for a physical block in which the data fragment can be written. Finally, each of the memory chips 20 writes the data fragment encoded with the second code into the memory 21 (step S116).

There may be a plurality of patterns in a configuration of a signal line between the controller 10A and the plurality of memory chips 20A in FIGS. 18 and 19. For example, as in the example of FIG. 3, the controller 10A may be connected to the plurality of memory chips 20A via a common data line. Hereinafter, an example of read processing in a case where the common data line is used for data transfer will be described.

Figure 21:
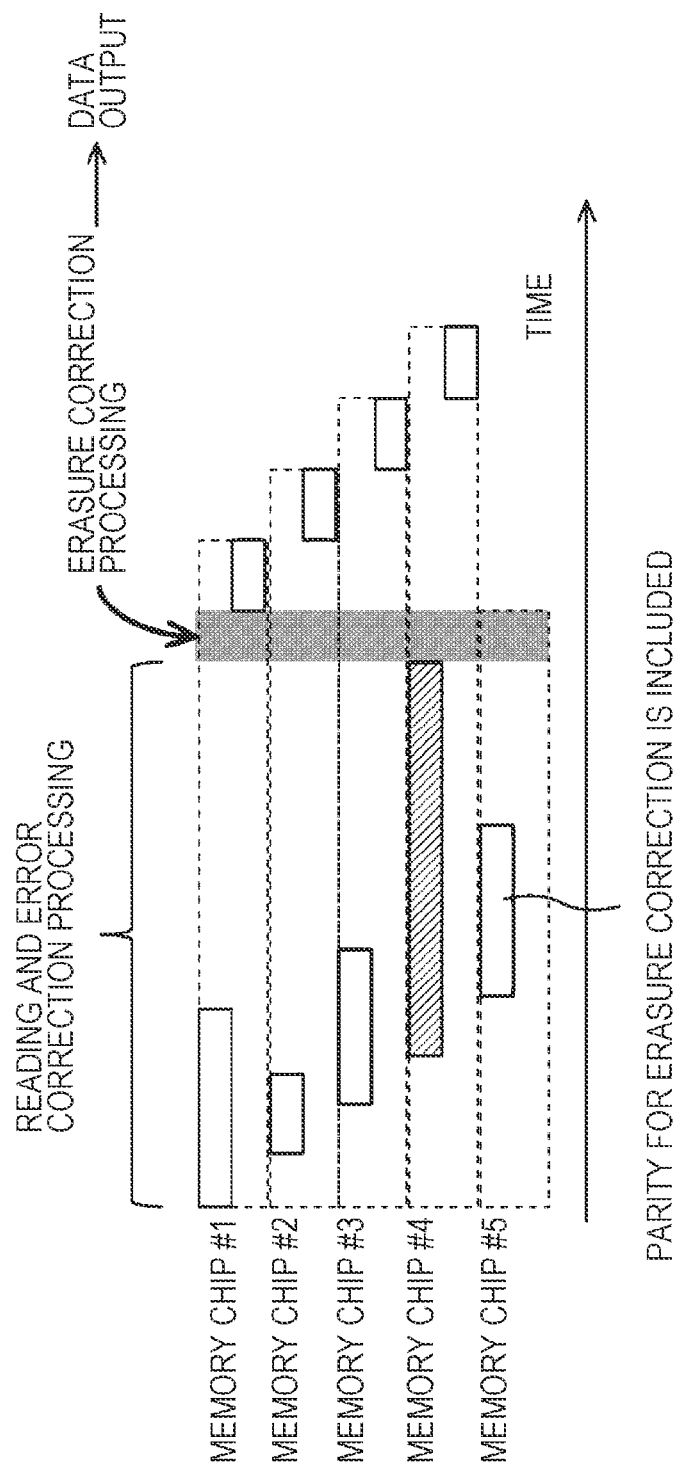
FIG. 21 is a timing chart in a case where the controller stands by until error correction processing on data read from all memory chips is completed.

FIG. 21 is a timing chart in a case where the controller 10A is connected to the plurality of memory chips 20A via the common data line and stands by until the error correction processing on the data read from all the memory chips is completed. The horizontal axis in FIG. 21 indicates time. In the example of FIG. 21, the controller 10A sequentially performs reading from the memory chips #1 to #5. The second decoder 19 of the controller 10A then performs the error correction processing on read data fragments. The error correction processing with the second code is completed for the data fragments read from the memory chips #1, #2, #3, and #5. The error-corrected data fragments each include a parity for erasure correction. On the other hand, the error correction processing is not completed for the data fragment read from the memory chip #4.

In the example of FIG. 21, after it is determined that the error correction on the data fragment read from the memory chip #4 cannot be performed, the first decoder 15 performs the erasure correction processing with the first code by using the data fragments read from the memory chips #1, #2, #3, and #5. Therefore, the overall read processing in the storage device is delayed due to the influence of the memory chip #4. In a case where the processing of FIG. 21 is performed, the entire read processing may be delayed even in a case where the error correction on the data fragment read from the memory chip #4 is completed with a delay. Therefore, as in the controller and the storage device according to the present disclosure, the erasure correction processing may be executed by use of data fragments for which the error correction has been completed even when there is a data fragment for which the error correction processing has not been completed.

Figure 22:
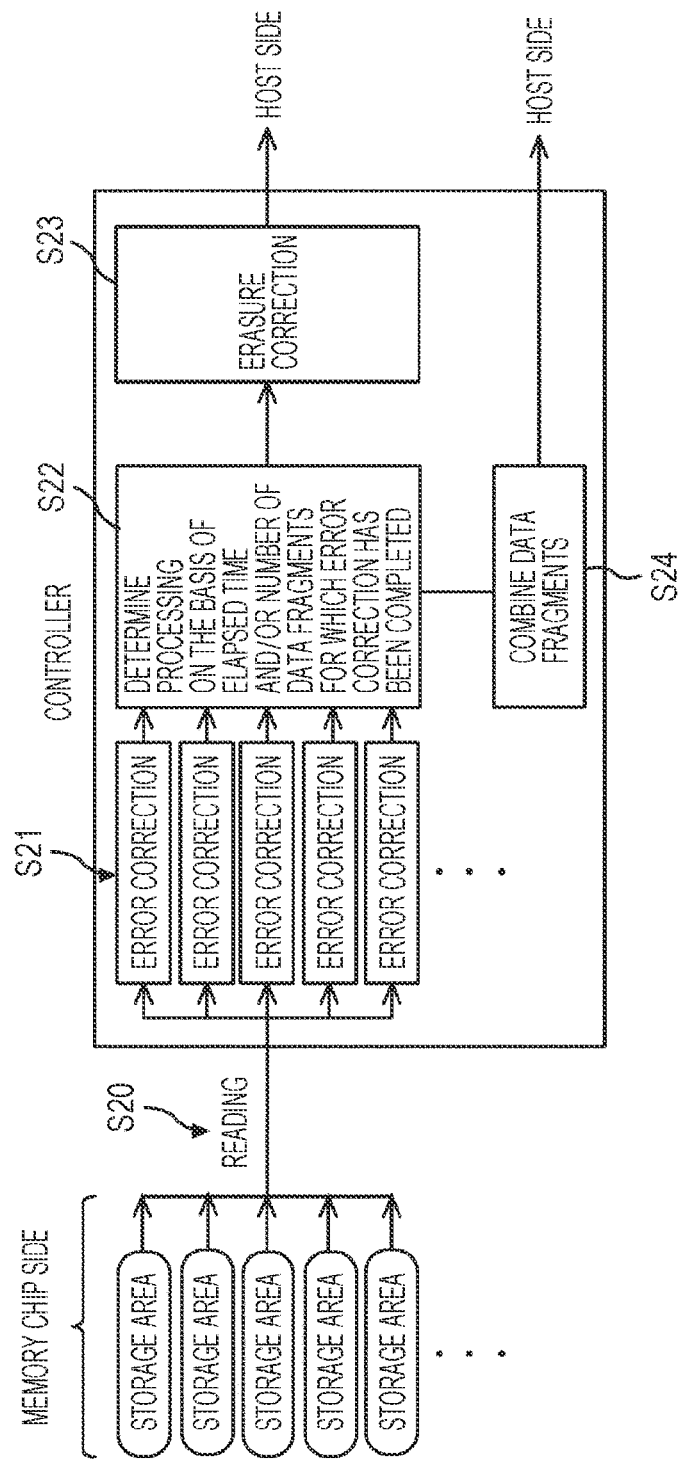
FIG. 22 is a diagram conceptually illustrating a data flow when the storage device performs reading in a case where a common data line is used in the second modification.

FIG. 22 conceptually illustrates an example of a data flow when the storage device performs reading in a case where the common data line is used in the second modification. First, the controller 10A sequentially reads data fragments from the plurality of memory chips 20A (step S20). The controller 10A then performs error correction processing with the second code on the read data fragments (step S21). As in the example of FIG. 22, the controller 10A may perform the error correction processing with the second code in parallel. Furthermore, the controller 10A may sequentially perform the error correction processing with the second code.

The controller 10A can then determine processing contents on the basis of the time elapsed from the start of the read processing and/or the number of data fragments for which the error correction has been completed (step S22). For example, in a case where the error correction on all the data fragments is completed within a predetermined time from the reception of a read request from the host system 2, the processing circuit 11 of the controller 10 combines the data fragments and reconfigures the data to be read (step S24). The reconfigured data is transferred to the host system 2. Furthermore, in a case where the error correction on such a number of data fragments that the first encoder 14 can perform erasure correction is completed within the predetermined time from the reception of the read request from the host system 2, the erasure correction is performed (step S23). The data reconfigured by the erasure correction is transferred to the host system 2. Note that, in a case where none of the above conditions is satisfied within the predetermined time from the reception of the read request from the host system 2, the controller 10A may interrupt the read processing and notify the host system 2 of the read failure.

Figure 23:
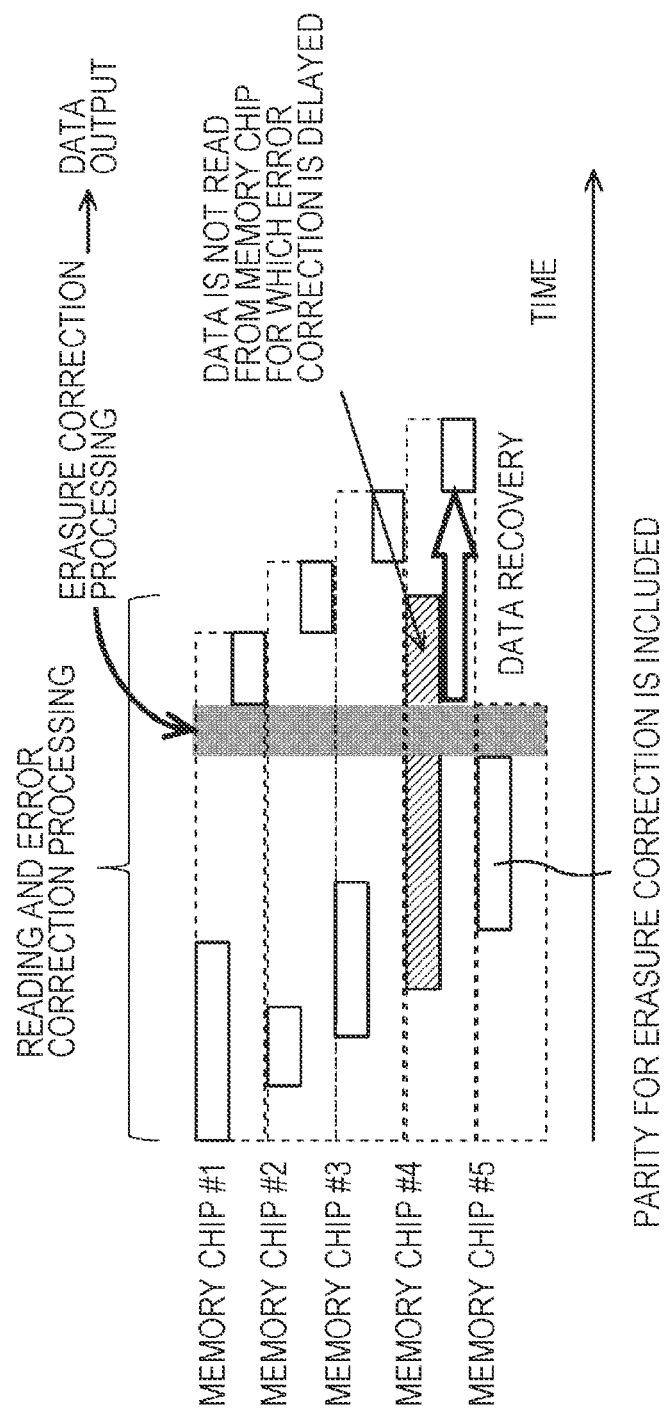
FIG. 23 is a timing chart illustrating an example of read processing of the storage device in a case where the common data line is used in the second modification.

FIG. 23 is a timing chart illustrating an example of the read processing of the storage device in a case where the common data line is used in the second modification. The horizontal axis in FIG. 23 indicates time. Also in the example of FIG. 23, the controller 10A sequentially performs reading from the memory chips #1 to #5. The second decoder 19 of the controller 10A then performs the error correction processing on read data fragments. The error correction processing with the second code is completed for the data fragments read from the memory chips #1, #2, #3, and #5. The error-corrected data fragments each include a parity for erasure correction. On the other hand, the error correction processing is not completed for the data fragment read from the memory chip #4.

In the example of FIG. 23, the first decoder 15 performs the erasure correction processing when the erasure correction on such a number of data fragments that the erasure correction with the first code can be performed is completed. That is, the first decoder 15 performs the erasure correction processing with the first code by using the data fragments read from the memory chips #1, #2, #3, and #5. The controller 10A does not wait until the error correction processing on the data fragment read from the memory chip #4 is completed or the error correction is determined to have failed. Therefore, the influence of the processing delay in a part of the memory chips can be reduced, and the overall read processing in the storage device can be speeded up.

Furthermore, as in the example of FIG. 14, the controller 10A may be connected to each of the memory chips 20A via individual data lines. Hereinafter, an example of read processing in a case where data transfer is performed by use of the individual data lines will be described.

Figure 24:
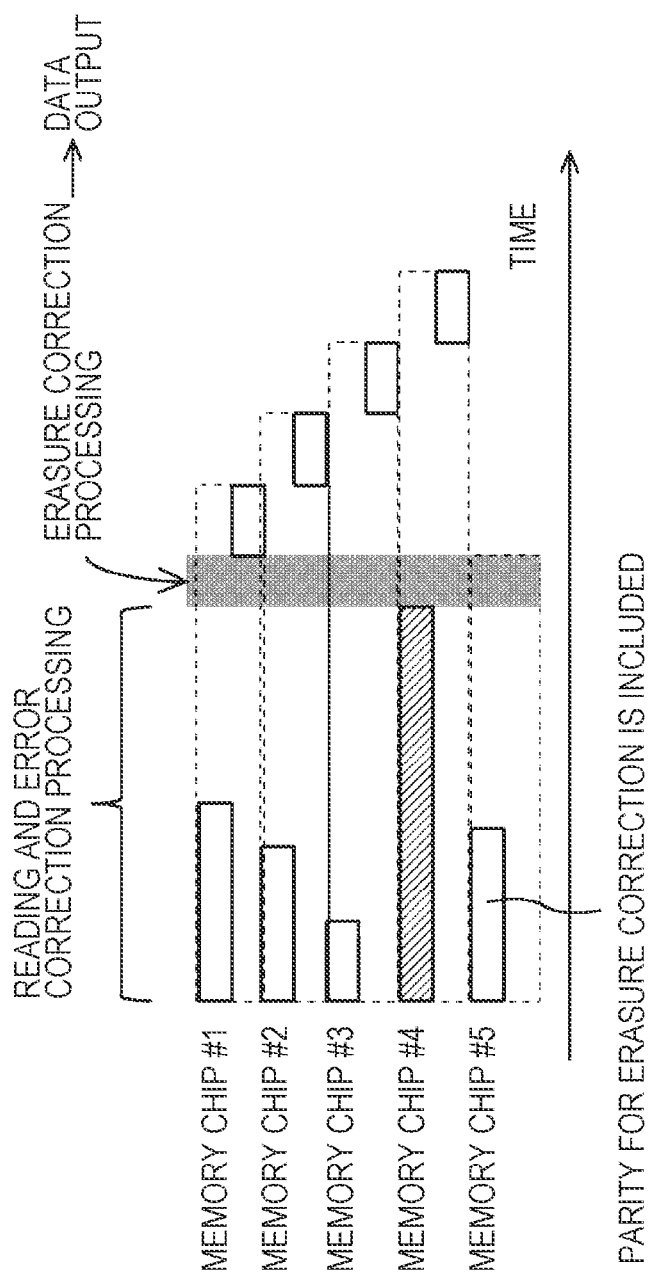
FIG. 24 is a timing chart in a case where the controller stands by until the error correction processing on the data read from all the memory chips is completed.

FIG. 24 is a timing chart in a case where the controller 10A is connected to each of the memory chips 20A via the individual data lines and stands by until the error correction processing on the data read from all the memory chips is completed. The horizontal axis in FIG. 24 indicates time. In the example of FIG. 24, the controller 10A performs reading in parallel from the memory chips #1 to #5. The second decoder 19 of the controller 10A then performs the error correction processing on read data fragments. The error correction processing with the second code is completed for the data fragments read from the memory chips #1, #2, #3, and #5. The error-corrected data fragments each include a parity for erasure correction. On the other hand, the error correction processing is not completed for the data fragment read from the memory chip #4.

In the example of FIG. 24, after it is determined that the error correction on the data fragment read from the memory chip #4 cannot be performed, the first decoder 15 performs the erasure correction processing with the first code by using the data fragments read from the memory chips #1, #2, #3, and #5. Therefore, the overall read processing in the storage device is delayed due to the influence of the memory chip #4. In a case where the processing of FIG. 24 is performed, the entire read processing may be delayed even in a case where the error correction on the data fragment read from the memory chip #4 is completed with a delay. Therefore, as in the controller and the storage device according to the present disclosure, the erasure correction processing may be executed by use of data fragments for which the error correction has been completed even when there is a data fragment for which the error correction processing has not been completed.

Figure 25:
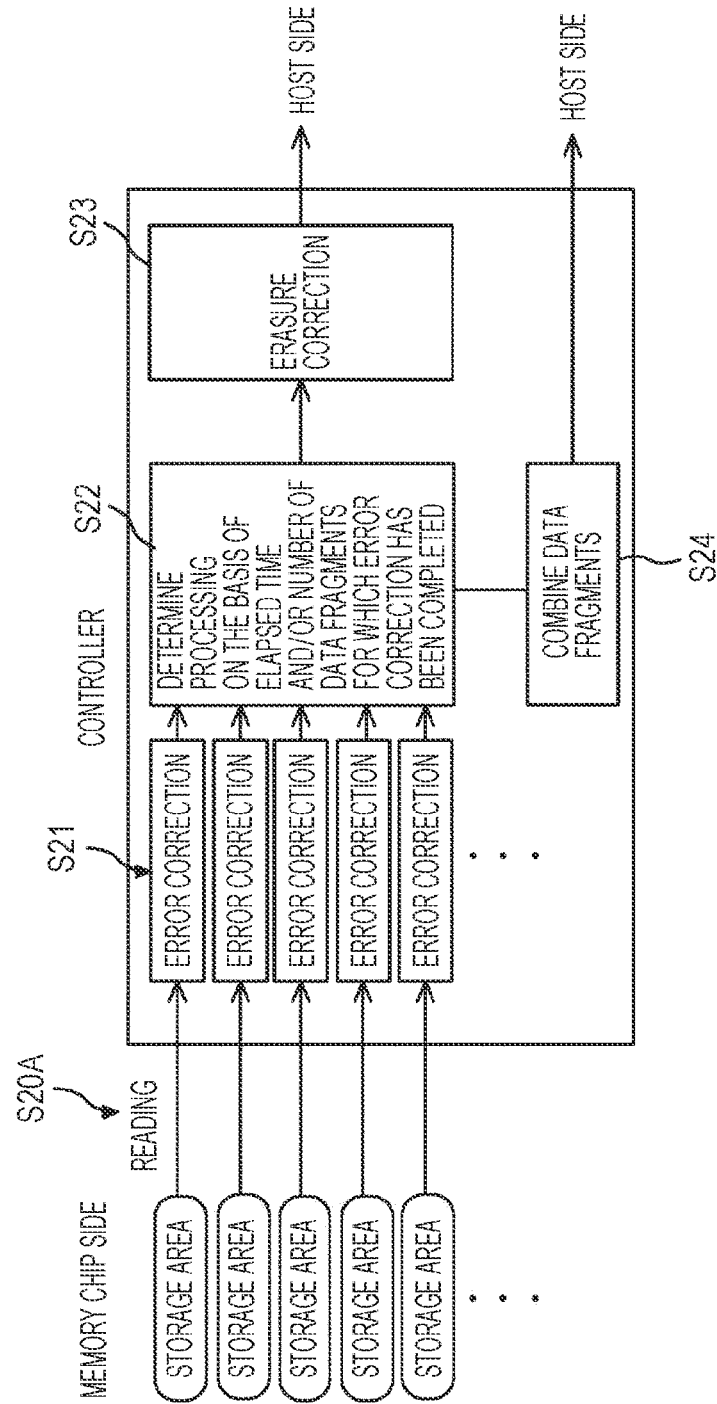
FIG. 25 is a diagram conceptually illustrating a data flow when the storage device performs reading in a case where a data line is prepared for each memory chip in the second modification.

FIG. 25 conceptually illustrates an example of a data flow when the storage device performs reading in a case where a data line is prepared for each memory chip in the second modification. First, the controller 10A reads data fragments in parallel from the plurality of memory chips 20A (step S20A). The controller 10A then performs error correction processing with the second code on the read data fragments (step S21). As in the example of FIG. 22, the controller 10A may perform the error correction processing with the second code in parallel. Furthermore, the controller 10A may sequentially perform the error correction processing with the second code.

The controller 10A can then determine processing contents on the basis of the time elapsed from the start of the read processing and/or the number of data fragments for which the error correction has been completed (step S22). For example, in a case where the error correction on all the data fragments is completed within a predetermined time from the reception of a read request from the host system 2, the processing circuit 11 of the controller 10 combines the data fragments and reconfigures the data to be read (step S24). The reconfigured data is transferred to the host system 2. Furthermore, in a case where the error correction on such a number of data fragments that the first encoder 14 can perform erasure correction is completed within the predetermined time from the reception of the read request from the host system 2, the erasure correction is performed (step S23). The data reconfigured by the erasure correction is transferred to the host system 2. Note that, in a case where none of the above conditions is satisfied within the predetermined time from the reception of the read request from the host system 2, the controller 10A may interrupt the read processing and notify the host system 2 of the read failure.

Figure 26:
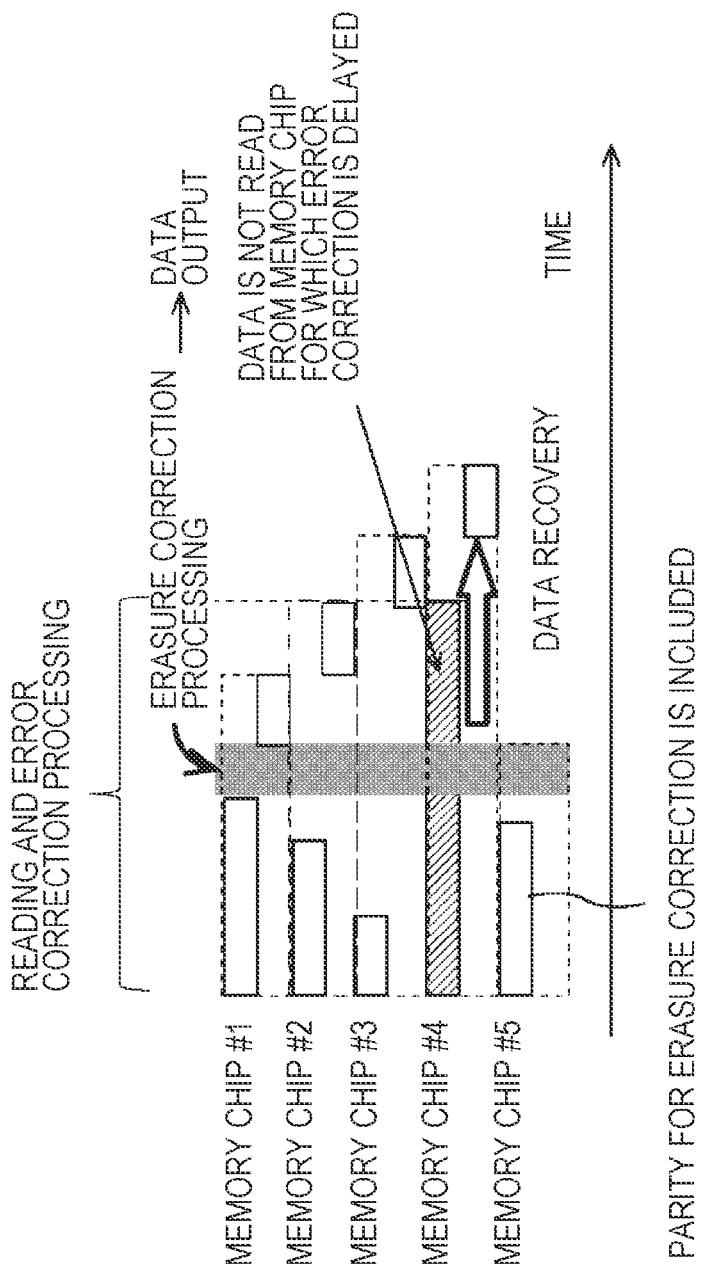
FIG. 26 is a timing chart illustrating an example of read processing of the storage device in a case where a data line is prepared for each memory chip in the second modification.

FIG. 26 illustrates an example of read processing of the storage device in a case where a data line is prepared for each memory chip in the second modification. The horizontal axis in FIG. 26 indicates time. Also in the example of FIG. 26, the controller 10A performs reading in parallel from the memory chips #1 to #5. The second decoder 19 of the controller 10A then performs the error correction processing on read data fragments. The error correction processing with the second code is completed for the data fragments read from the memory chips #1, #2, #3, and #5. The error-corrected data fragments each include a parity for erasure correction. On the other hand, the error correction processing is not completed for the data fragment read from the memory chip #4.

In the example of FIG. 26, the first decoder 15 performs the erasure correction processing when the erasure correction on such a number of data fragments that the erasure correction with the first code can be performed is completed. That is, the first decoder 15 performs the erasure correction processing with the first code by using the data fragments read from the memory chips #1, #2, #3, and #5. The controller 10A does not wait until the error correction processing on the data fragment read from the memory chip #4 is completed or the error correction is determined to have failed. Therefore, the influence of the delay in a part of the memory chips can be reduced, and the overall read processing in the storage device can be speeded up.

Figure 27:
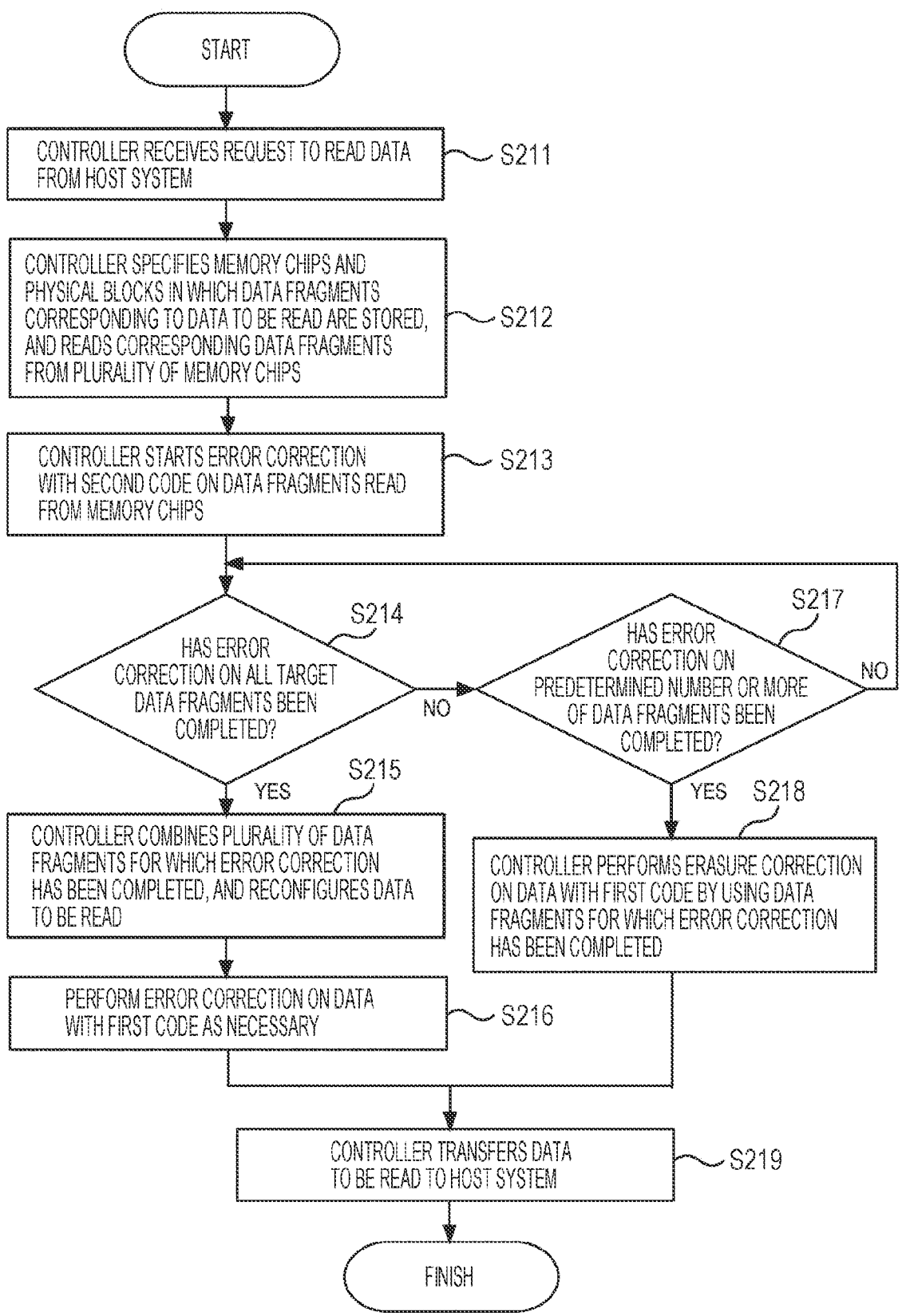
FIG. 27 is a flowchart illustrating an example of data read processing in the second modification.

The flowchart of FIG. 27 illustrates an example of data read processing in the second modification. Hereinafter, an example of the read processing in the storage device according to the present disclosure will be described with reference to the flowchart of FIG. 27.

First, the controller 10A receives a request to read data from the host system 2 (step S211). The controller 10A then refers to the lookup table 12, specifies target memory chips among the memory chip 20A and physical blocks in which a plurality of data fragments corresponding to the data to be read is stored, and reads the corresponding data fragments from the plurality of memory chips (step S212). The controller 10A may sequentially read the data fragments from the plurality of memory chips. Furthermore, the controller 10A may read the plurality of data fragments in parallel from the plurality of memory chips. That is, the order and timing of reading the data fragments by the controller 10A are not limited. Next, the second decoder 19 of the controller 10A starts the error correction with the second code on the data fragments read from the memory chips 20A (step S213).

The controller 10A then determines whether or not the error correction on all the target data fragments has been completed (step S214). For example, in a case where a data fragment is read from each of N memory chips 20A, the controller 10A confirms in step S204 whether or not the error correction on N data fragments has been completed.

The processing branches depending on the determination result in step S214. In a case where the error correction on all the target data fragments is completed (YES in step S214), the processing circuit 11 of the controller 10A combines the plurality of data fragments for which the error correction has been completed, and reconfigures the data to be read (step S215). For example, the controller 10A can arrange the plurality of data fragments on the buffer memories or cache memories, and reconfigure the data.

The first decoder 15 of the controller 10A can then perform error correction on the reconfigured data with the first code as necessary (step S216). However, the controller 10A may omit the processing of step S216. Finally, the controller 10A transfers the data to be read to the host system 2 (step S219).

In a case where the error correction on all the target data fragments is not completed (NO in step S214), the controller 10A determines whether or not the error correction on a predetermined number of data fragments has been completed (step S217). Here, as the predetermined number, the number M-u of data fragments, which is necessary for the first decoder 15 to perform the erasure correction, can be used. However, an integer value larger than this may be used in step S217.

The processing branches depending on the determination result in step S217. In a case where the number of data fragments for which the error correction has been completed is less than the predetermined number (NO in step S217), the controller 10A executes the determination in step S214 again. In a case where the error correction on the predetermined number of data fragments is completed (YES in step S217), the first decoder 15 of the controller 10A performs the erasure correction on the data with the first code by using the data fragments for which the error correction has been completed (step S218). For example, the controller 10A can arrange the data fragments on the buffer memories or cache memories to perform the erasure correction. Finally, the controller 10A transfers the data subjected to the erasure correction to the host system 2 (step S219).

Hereinafter, an outline of a configuration of a controller according to the present disclosure will be described.

A controller according to the present disclosure may include a processing circuit, a first encoder, a second encoder, a second decoder, and a first decoder. The processing circuit is configured to write each of a plurality of data fragments each including a part of data to be written in one memory chip of a plurality of memory chips, and read the data fragments corresponding to the data to be read from the memory chips. The first encoder is configured to encode the data to be written with an erasure correction code such that each of the data fragments includes a parity. The second encoder is configured to encode the data fragments with an error correction code before the processing circuit writes the data fragments in the memory chips. The second decoder is configured to perform error correction on the data fragments read from the memory chips by the processing circuit. The first decoder is configured to perform erasure correction by use of a part of the data fragments for which the error correction by the second decoder has been completed among the data fragments corresponding to the data to be read.

The first decoder may be configured to perform, when the second decoder is performing the error correction on at least one of the data fragments, the erasure correction by use of another part of the data fragments for which the error correction has been completed.

An outline of a configuration of a storage device according to the present disclosure will also be described.

A storage device according to the present disclosure may include a plurality of memory chips and a controller. The controller is configured to encode data to be written with an erasure correction code such that each of a plurality of data fragments obtained by dividing the data includes a parity, divide the data into the plurality of data fragments, encode the data fragments with an error correction code, and write each of the data fragments in one memory chip of the plurality of memory chips. Furthermore, the controller is configured to perform error correction on the data fragments read from the memory chips when the data is read, and perform erasure correction by use of a part of the data fragments for which the error correction has been completed among the data fragments corresponding to the data to be read.

In the storage device according to the present disclosure, the controller may be electrically connected to the plurality of memory chips via individual data lines. The controller may be electrically connected to the plurality of memory chips via a common data line. The memory chips may include a NAND flash memory.

The storage device according to the present disclosure may further include an interface conversion circuit. The interface conversion circuit is configured to convert the data read by the controller into a packet capable of being transferred by a network and convert the packet received from the network into a format capable of being input to the controller.

As described above, the technology according to the present disclosure improves read performance of a storage device in which data to be written is divided into data fragments and the data fragments are stored in a plurality of memory chips.

In the storage device according to the present disclosure, the error correction function with the second code (the second encoder and the second decoder) may be implemented on the side of the memory chips. In this case, each memory chip that has received a request to start reading a data fragment from the controller reads the data fragment and starts error correction with the second code. Each memory chip can notify the controller of the completion status of the error correction processing or success or failure of the error correction via a signal line connecting the memory chip and the controller. The controller reads the memory fragments for which the error correction has been completed. Then, even if there is a memory chip for which the error correction has not been completed, the controller can start erasure correction when reading of such a number of memory fragments that the erasure correction can be performed is completed. Furthermore, the controller does not need to read registers mounted on the memory chips in order to confirm the results of the error correction. Therefore, the influence of the delay in a part of the memory chips can be reduced, and the overall read speed of the storage device can be improved.

Furthermore, in the storage device according to the present disclosure, the error correction function with the second code (the second encoder and the second decoder) may be mounted on the controller side. In this case, the controller first reads the data fragments from the memory chips. The controller then starts error correction on the read data fragments. Even if there is a data fragment for which the error correction is not completed, the controller can start the erasure correction when the error correction on such a number of data fragments that the erasure correction can be performed is completed. Therefore, even if there is a read delay in a part of the memory chips or a delay in error correction on a part of the data fragments, it is possible to reduce the influence of the delay and improve the overall read speed of the storage device.

As described above, in the field of storage devices, there have been problems such as an increase in a bit error rate due to adoption of a miniaturization process or a multi-level cell in a NAND flash memory, and an increase in traffic between memory chips and a controller or power consumption and latency of a system due to an error correction code. When the controller and the storage device according to the present disclosure are used, both high reliability and performance can be achieved, and these problems can be solved.

Note that the present technology can have the following configurations.

(1) A controller including:
a processing circuit configured to write each of a plurality of data fragments each including a part of data to be written in one memory chip of a plurality of memory chips each having an error correction function, and
read the data fragments corresponding to the data to be read from the memory chips;
a first encoder configured to encode the data to be written with an erasure correction code such that each of the data fragments includes a parity; and
a first decoder configured to perform erasure correction by use of a part of the data fragments corresponding to the data to be read according to a completion status or success or failure of error correction on a corresponding part of the data fragments in each of the memory chips, the completion status or the success or failure of the error correction being acquired via a signal line.

(2) The controller according to (1), in which
the processing circuit is configured to refer to the signal line and read the data fragments from the memory chips in an order in which the error correction has been completed.

(3) The controller according to (1) or (2), in which the first decoder is configured to perform the erasure correction when the processing circuit reads a part of the data fragments from a part of the memory chips among the memory chips in which the data fragments have been written.

(4) The controller according to any one of (1) to (3), in which the first decoder is configured to perform the erasure correction by use of a part of the data fragments read by the processing circuit when at least one of the memory chips is performing the error correction.

(5) The controller according to any one of (1) to (4), in which the processing circuit is configured to notify a host system of the completion status or the success or failure of the error correction on the corresponding part of the data fragments in each of the memory chips.

(6) A controller including:

a processing circuit configured to write each of a plurality of data fragments each including a part of data to be written in one memory chip of a plurality of memory chips, and read the data fragments corresponding to the data to be read from the memory chips;

a first encoder configured to encode the data to be written with an erasure correction code such that each of the data fragments includes a parity;

a second encoder configured to encode the data fragments with an error correction code before the processing circuit writes the data fragments in the memory chips;

a second decoder configured to perform error correction on the data fragments read from the memory chips by the processing circuit; and a first decoder configured to perform erasure correction by use of a part of the data fragments for which the error correction by the second decoder has been completed among the data fragments corresponding to the data to be read.

(7) The controller according to (6), in which the first decoder is configured to perform, when the second decoder is performing the error correction on at least one of the data fragments, the erasure correction by use of another part of the data fragments for which the error correction has been completed.

(8) A storage device including:

a plurality of memory chips each having an error correction function; and a controller configured to encode data to be written with an erasure correction code such that each of a plurality of data fragments obtained by dividing the data includes a parity, divide the data into the plurality of data fragments, write each of the data fragments in one memory chip of the plurality of memory chips, and perform erasure correction by use of a part of the data fragments among the data fragments corresponding to the data to be read according to a completion status or success or failure of error correction on a corresponding part of the data fragments in each of the memory chips, the completion status or the success or failure of the error correction being acquired via a signal line.

(9) The storage device according to (8), in which the controller is configured to perform the erasure correction by use of a read part of the data fragments when at least one of the memory chips is performing the error correction.

(10) The storage device according to (8) or (9), in which the memory chips include a second encoder configured to encode the data fragments written by the controller with an error correction code and then store the data fragments in memory cells, and a second decoder configured to perform error correction on the data fragments corresponding to the data to be read and notify the controller of a completion status or success or failure of the error correction via the signal line.

(11) The storage device according to any one of (8) to (10), in which the controller is electrically connected to the plurality of memory chips via individual data lines.

(12) The storage device according to any one of (8) to (11), in which the controller is electrically connected to the plurality of memory chips via a common data line.

(13) The storage device according to any one of (8) to (12), in which the memory chips include a NAND flash memory.

(14) The storage device according to any one of (8) to (13), in which the controller is configured to notify a host system of the completion status or the success or failure of the error correction on the corresponding part of the data fragments in each of the memory chips.

(15) The storage device according to any one of (8) to (14), further including an interface conversion circuit configured to convert the data read by the controller into a packet capable of being transferred by a network and convert the packet received from the network into a format capable of being input to the controller.

(16) A storage device including:

a plurality of memory chips; and a controller configured to encode data to be written with an erasure correction code such that each of a plurality of data fragments obtained by dividing the data includes a parity, divide the data into the plurality of data fragments, encode the data fragments with an error correction code, write each of the data fragments in one memory chip of the plurality of memory chips, perform error correction on the data fragments read from the memory chips when the data is read, and perform erasure correction by use of a part of the data fragments for which the error correction has been completed among the data fragments corresponding to the data to be read.

(17) The storage device according to (16), in which the controller is electrically connected to the plurality of memory chips via individual data lines.

(18) The storage device according to (16) or (17), in which the controller is electrically connected to the plurality of memory chips via a common data line.

(19) The storage device according to any one of (16) to (18), in which the memory chips include a NAND flash memory.

(20) The storage device according to any one of (16) to (19), further including an interface conversion circuit configured to convert the data read by the controller into a packet capable of being transferred by a network and convert the packet received from the network into a format capable of being input to the controller.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions can be made without departing from the conceptual idea and spirit of the present disclosure derived from the contents defined in the claims and equivalents thereof.

REFERENCE SIGNS LIST 1, 1A System
2 Host system
3 Bus
4 Interface conversion circuit
5 Network
10, 10A Controller
14 First encoder
15 First decoder
16 First interface circuit
17 Monitoring unit
18, 24 Second encoder
19, 25 Second decoder
20, 20A Memory chip
21 Memory
22 Read/write circuit
23 Second interface circuit
100, 101, 102 Storage device
1000 Circuit block

The invention claimed is:

1. A controller, comprising:
a processing circuit configured to:
    write each data fragment of a plurality of data fragments in one memory chip of a plurality of memory chips, wherein
        each data fragment of the plurality of data fragments includes a part of data to be written, and
        each memory chip of the plurality of memory chips has an error correction function; and
    read the plurality of data fragments corresponding to data to be read from the plurality of memory chips;
a first encoder configured to encode the data to be written with an erasure correction code such that each data fragment of the plurality of data fragments includes a parity; and
a first decoder configured to perform erasure correction by use of a part of the plurality of data fragments corresponding to the data to be read according to a completion status of error correction on a corresponding part of the plurality of data fragments in each memory chip of the plurality of memory chips, wherein the completion status of the error correction is acquired via a signal line.

2. The controller according to claim 1, wherein the processing circuit is further configured to refer to the signal line and read the plurality of data fragments from the plurality of memory chips in an order in which the error correction has been completed.

3. The controller according to claim 1, wherein the first decoder is further configured to perform the erasure correction in a case where the processing circuit reads the part of the plurality of data fragments from a part of the plurality of memory chips among the plurality of memory chips in which the plurality of data fragments have been written.

4. The controller according to claim 1, wherein the first decoder is further configured to perform the erasure correction by the use of the part of the plurality of data fragments read by the processing circuit while at least one of the plurality of memory chips performs the error correction.

5. The controller according to claim 1, wherein the processing circuit is further configured to notify a host system of one of the completion status or success or failure of the error correction on the corresponding part of the plurality of data fragments in each memory chip of the plurality of memory chips.

6. A controller, comprising:
a processing circuit configured to:
    write each data fragment of a plurality of data fragments in one memory chip of a plurality of memory chips, wherein each data fragment of the plurality of data fragments includes a part of data to be written; and
    read the plurality of data fragments corresponding to data to be read from the plurality of memory chips;
a first encoder configured to encode the data to be written with an erasure correction code such that each data fragment of the plurality of data fragments includes a parity;
a second encoder configured to encode the plurality of data fragments with an error correction code before the processing circuit writes the plurality of data fragments in the plurality of memory chips;
a second decoder configured to perform error correction on the plurality of data fragments read from the plurality of memory chips by the processing circuit; and
a first decoder configured to perform erasure correction by use of a part of the plurality of data fragments for which the error correction by the second decoder has been completed among the plurality of data fragments corresponding to the data to be read.

7. The controller according to claim 6, wherein the first decoder is further configured to perform, while the second decoder performs the error correction on at least one of the plurality of data fragments, the erasure correction by use of another part of the plurality of data fragments for which the error correction has been completed.

8. A storage device, comprising:
a plurality of memory chips each having an error correction function; and
a controller configured to:
    divide data to be written into a plurality of data fragments;
    encode the data to be written with an erasure correction code such that each data fragment of the plurality of data fragments includes a parity;
    write each of the plurality of data fragments in one memory chip of the plurality of memory chips; and
    perform erasure correction by use of a part of the plurality of data fragments among the plurality of data fragments corresponding to data to be read according to a completion status of error correction on a corresponding part of the plurality of data fragments in each memory chip of the plurality of memory chips, wherein the completion status of the error correction is acquired via a signal line.

9. The storage device according to claim 8, wherein the controller is further configured to perform the erasure correction by use of a read part of the plurality of data fragments while at least one of the plurality of memory chips performs the error correction.

10. The storage device according to claim 8, wherein the plurality of memory chips include:
a second encoder configured to:
    encode the plurality of data fragments written by the controller with an error correction code; and store the plurality of data fragments in memory cells; and a second decoder configured to:
perform the error correction on the plurality of data fragments corresponding to the data to be read; and
notify the controller of one of the completion status or success or failure of the error correction via the signal line.

11. The storage device according to claim 8, wherein the controller is electrically connected to the plurality of memory chips via individual data lines.

12. The storage device according to claim 8, wherein the controller is electrically connected to the plurality of memory chips via a common data line.

13. The storage device according to claim 8, wherein the plurality of memory chips each includes a NAND flash memory.

14. The storage device according to claim 8, wherein the controller is further configured to notify a host system of one of the completion status or success or failure of the error correction on the corresponding part of the plurality of data fragments in each memory chip of the plurality of memory chips.

15. The storage device according to claim 8, further comprising an interface conversion circuit configured to:
convert the data read by the controller into a packet for transfer by a network; and
convert the packet received from the network into a format for input to the controller.

16. A storage device, comprising:
a plurality of memory chips; and
a controller configured to:
divide data to be written into a plurality of data fragments;
encode the data to be written with an erasure correction code such that each data fragment of the plurality of data fragments includes a parity;
encode the plurality of data fragments with an error correction code;
write each data fragment of the plurality of data fragments in one memory chip of the plurality of memory chips;
perform error correction on the plurality of data fragments read from the plurality of memory chips in a case where the data is read; and
perform erasure correction by use of a part of the plurality of data fragments for which the error correction has been completed among the plurality of data fragments corresponding to the data that is read.

17. The storage device according to claim 16, wherein the controller is electrically connected to the plurality of memory chips via individual data lines.

18. The storage device according to claim 16, wherein the controller is electrically connected to the plurality of memory chips via a common data line.

19. The storage device according to claim 16, wherein the plurality of memory chips each includes a NAND flash memory.

20. The storage device according to claim 16, further comprising an interface conversion circuit configured to:
convert the data read by the controller into a packet for transfer by a network; and
convert the packet received from the network into a format for input to the controller.

* * * * *